United States Patent
Wang et al.

(10) Patent No.: US 12,520,197 B2
(45) Date of Patent: Jan. 6, 2026

(54) POWER EFFICIENT BROADCASTING IN WLAN

(71) Applicant: INTERDIGITAL PATENT HOLDINGS, INC., Wilmington, DE (US)

(72) Inventors: Xiaofei Wang, North Caldwell, NJ (US); Hanqing Lou, Syosset, NY (US); Frank LaSita, Setauket, NY (US)

(73) Assignee: INTERDIGITAL PATENT HOLDINGS, INC., Wilmington, DE (US)

(*) Notice: Subject to any disclaimer, the term of this patent is extended or adjusted under 35 U.S.C. 154(b) by 679 days.

(21) Appl. No.: 17/797,753

(22) PCT Filed: Feb. 5, 2021

(86) PCT No.: PCT/US2021/016864
§ 371 (c)(1),
(2) Date: Aug. 5, 2022

(87) PCT Pub. No.: WO2021/158950
PCT Pub. Date: Aug. 12, 2021

(65) Prior Publication Data
US 2023/0100162 A1    Mar. 30, 2023

Related U.S. Application Data

(60) Provisional application No. 63/042,059, filed on Jun. 22, 2020, provisional application No. 62/971,621, filed on Feb. 7, 2020.

(51) Int. Cl.
H04W 28/18    (2009.01)
H04L 12/18    (2006.01)

(52) U.S. Cl.
CPC ......... *H04W 28/18* (2013.01); *H04L 12/1863* (2013.01)

(58) Field of Classification Search
None
See application file for complete search history.

(56) References Cited

U.S. PATENT DOCUMENTS

2002/0106985 A1*  8/2002  Sato ................ H04L 12/1868
                                                            455/422.1
2018/0110046 A1*  4/2018  Patil ................ H04W 72/0446
(Continued)

OTHER PUBLICATIONS

Asterjadhi et al., "802.11ax operation in 6GHz band," IEEE 802.11-18/1256r0 (Jul. 8, 2018).
(Continued)

*Primary Examiner* — Steve R Young
(74) *Attorney, Agent, or Firm* — Volpe Koenig

(57) ABSTRACT

Devices, methods, and/or systems for broadcasting in a wireless local area network (WLAN). A STA receives a frame from a wireless access point (AP) which includes an indication that an enhanced broadcast service (eBCS) service is ending. The frame may include an end-of-broadcast-service announcement information element, and/or an indication of a time at which the eBCS service is ending. The STA may negotiate with the AP for continuation of the broadcast service if the STA desires to continue receiving the eBCS service beyond the time at which the eBCS service ends. The STA may receive a trigger frame from the AP which triggers a response from the STA indicating that it desires to continue receiving the eBCS service beyond the time at which the eBCS service ends.

6 Claims, 20 Drawing Sheets

(56) References Cited

U.S. PATENT DOCUMENTS

| | | | | |
|---|---|---|---|---|
| 2018/0220169 A1* | 8/2018 | Yang | .................... | H04N 21/858 |
| 2020/0015043 A1* | 1/2020 | Patil | ........................ | H04W 4/06 |
| 2020/0084696 A1* | 3/2020 | McCann | ............... | H04W 48/14 |

OTHER PUBLICATIONS

Choi et al., "View on EHT Objectives and Technologies," IEEE 802.11-18/1171r0 (Jul. 8, 2018).

Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Enhancements for Very High Throughput for Operation in Bands below 6GHZ, IEEE P802.11ac/D1.0 (May 2011).

Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 1: Enhancements for High Efficiency WLAN, IEEE P802.11ax/D6.0 (Nov. 2019).

Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 1: Enhancements for High Efficiency WLAN, IEEE P802.11ax/D8.0 (Oct. 2020).

Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 4: Enhanced Broadcast Service, IEEE P802.11bc/D1.01 (Jan. 2021).

Gidvani et al., "6 GHz operation for 11ax," IEEE 802.11-18/1607r1 (Sep. 11, 2018).

Hart et al., "Recommended Direction for EHT," IEEE 802.11-18/1549r0 (Sep. 9, 2018).

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11.2012 (Mar. 29, 2012).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHZ, IEEE Std 802.11ac-2013 (Dec. 11, 2013).

IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).

IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11.2020 (Dec. 3, 2020).

Lepp et al., "802.11bc Air Time Consumption Control," IEEE 802.11-19/0377r0 (Mar. 8, 2019).

Lepp et al., "What is a broadcast service?," IEEE 802.11-19/0128r0 (Jan. 14, 2019).

Montemurro, "EHT TIG Agenda," IEEE 802.11-18/1067r2 (Jul. 10, 2018).

Porat et al., "Distributed MU-MIMO and HARQ Support for EHT," IEEE 802.11-18/1116r0 (Jul. 6, 2018).

Shilo et al., "HARQ for EHT," IEEE 802.11-18/1587r1 (Sep. 3, 2018).

Wang et al., "Power Efficient Broadcasting," IEEE 802.11-20/551r5 (Mar. 15, 2020).

Wang et al., "Spec Text for Power Efficient eBCS," IEEE 802.11-20/886r3 (Jun. 18, 2020).

Yang et al., "Discussion on EHT Study Group Formation," IEEE 802.11-18/1180r0 (Jul. 9, 2018).

* cited by examiner

US 12,520,197 B2

POWER EFFICIENT BROADCASTING IN WLAN

CROSS-REFERENCE TO RELATED APPLICATIONS

This application is the U.S. National Stage, under 35 U.S.C. § 371, of International Application No. PCT/US2021/016864 filed Feb. 5, 2021, which claims the benefit of U.S. Provisional Application No. 62/971,621, filed Feb. 7, 2020 and U.S. Provisional Application No. 63/042,059, filed Jun. 22, 2020, the contents of which are incorporated herein by reference.

BACKGROUND

A WLAN in Infrastructure Basic Service Set (BSS) mode may include an Access Point (AP) for the BSS and one or more stations (STAs) associated with the AP. An enhanced broadcast service (eBCS) may include downlink from an AP to non-AP STAs or may include uplink from sensor non-AP STAs. Enhanced Broadcast Service may be provided to both STAs that are associated or un-associated with a particular AP. Some example use cases for eBCS may include stadium video broadcasting; automotive broadcasting; uplink sensor data broadcasting; museum information and multilingual broadcasting; and/or event producer information and content broadcasting.

SUMMARY

Devices, methods, and/or systems for broadcasting in a wireless local area network (WLAN). A STA receives a frame from a wireless access point (AP) which includes an indication that an enhanced broadcast service (eBCS) service is ending. The frame may include an end-of-broadcast-service announcement information element, and/or an indication of a time at which the eBCS service is ending. The STA may negotiate with the AP for continuation of the broadcast service if the STA desires to continue receiving the eBCS service beyond the time at which the eBCS service ends. The STA may receive a trigger frame from the AP which triggers a response from the STA indicating that it desires to continue receiving the eBCS service beyond the time at which the eBCS service ends.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
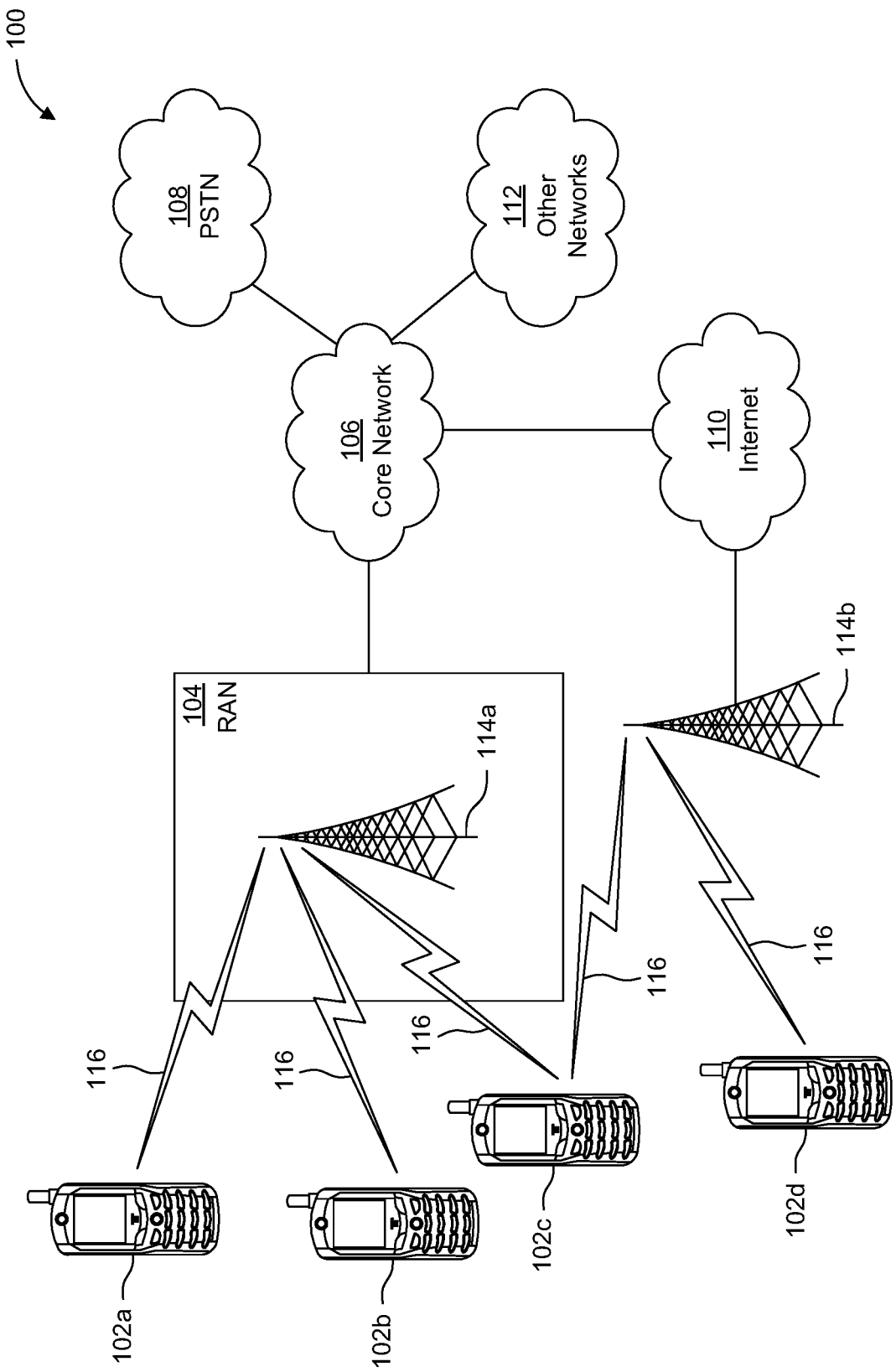
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
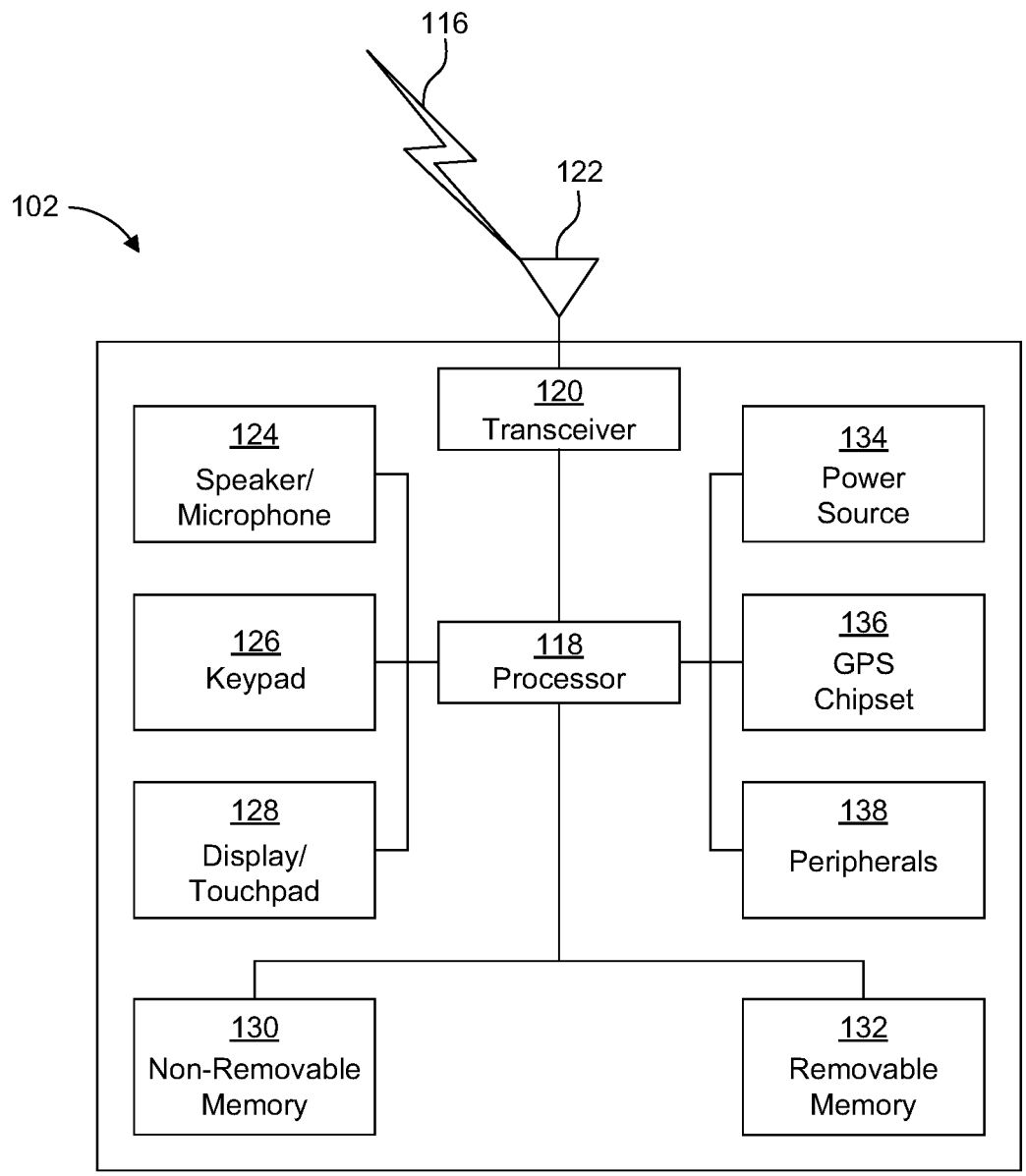
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 1C:
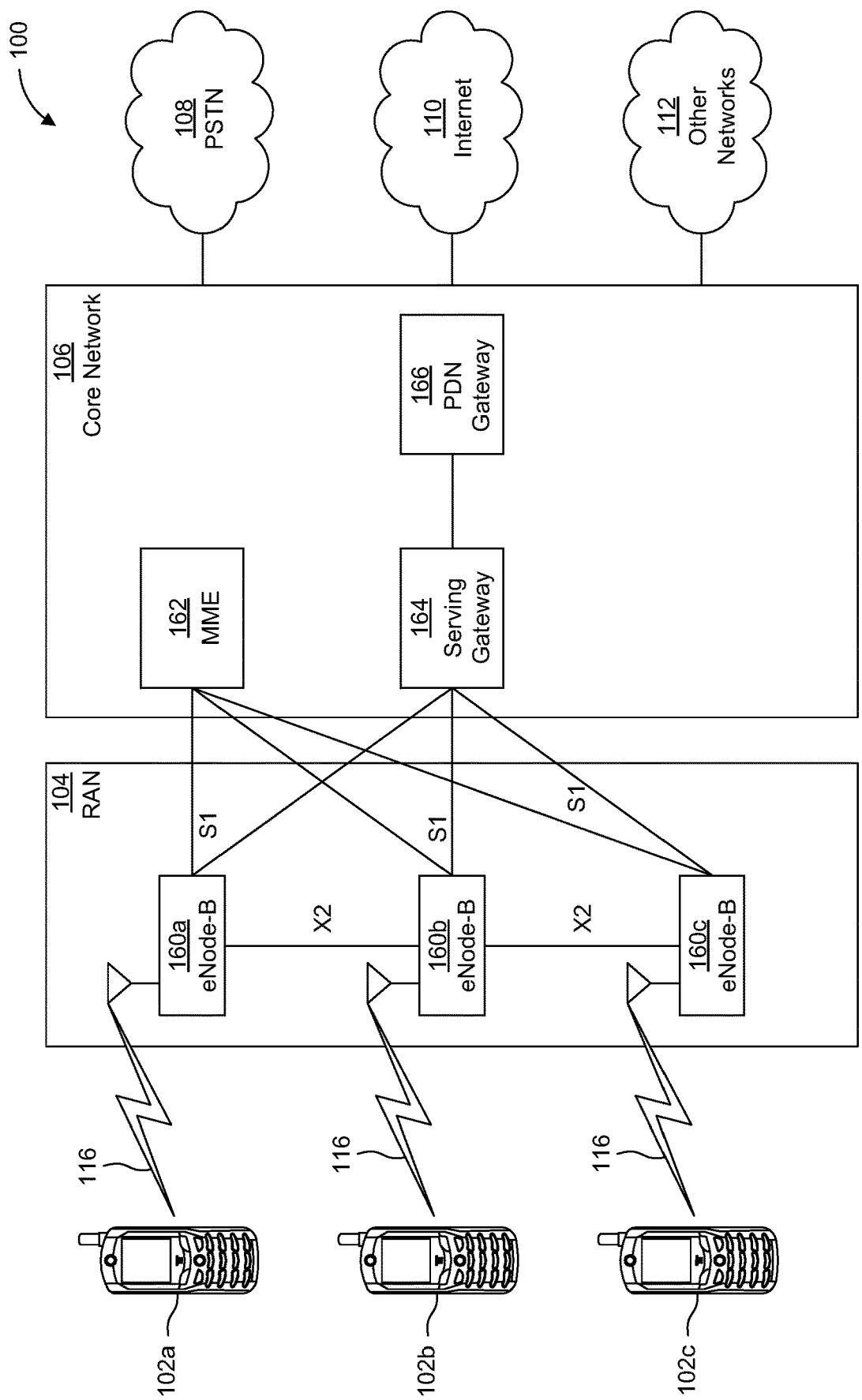
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
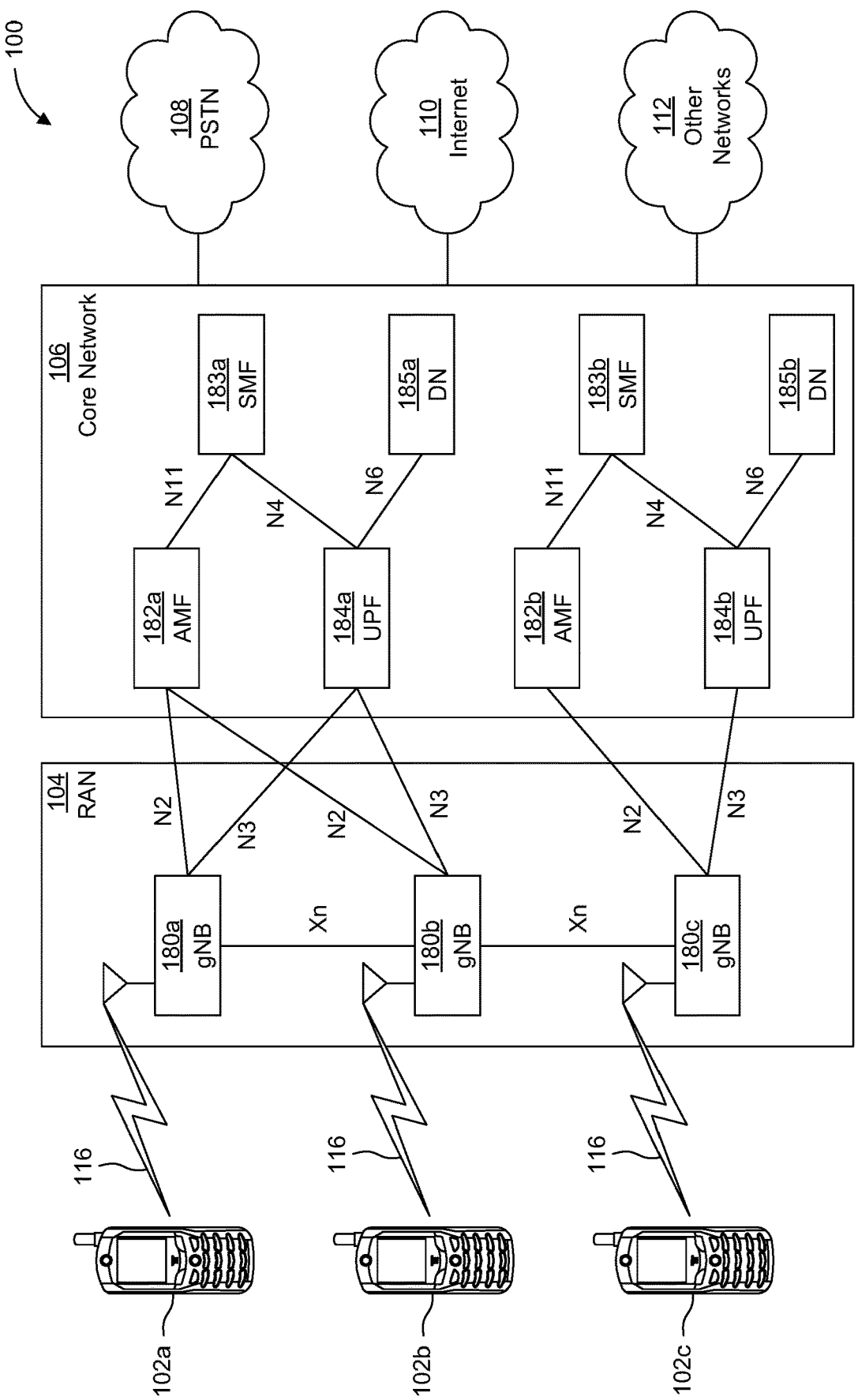
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a, 184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

A WLAN in Infrastructure Basic Service Set (BSS) mode may include an Access Point (AP) for the BSS and one or more stations (STAs) associated with the AP. The AP typically has access or interface to a Distribution System (DS) or another type of wired/wireless network that carries traffic in and out of the BSS. Traffic to STAs that originates from outside the BSS may arrive through the AP and is delivered to the STAs. Traffic originating from STAs to destinations outside the BSS may be sent to the AP to be delivered to the respective destinations. Traffic between STAs within the BSS may also be sent through the AP where the source STA sends traffic to the AP and the AP delivers the traffic to the destination STA. Such traffic between STAs within a BSS may be considered peer-to-peer traffic. Such peer-to-peer traffic may also be sent directly between the source and destination STAs with a direct link setup (DLS), e.g., using an 802.11e DLS or an 802.11z tunnelled DLS (TDLS). A WLAN using an Independent BSS (IBSS) mode may have no AP, and/or may include STAs, communicating directly with each other. This mode of communication is referred to as an "ad-hoc" mode of communication.

Using the 802.11ac infrastructure mode of operation, the AP may transmit a beacon on a fixed channel, e.g., the primary channel. This channel may be 20 MHz wide, and may be the operating channel of the BSS. This channel may also be used by the STAs to establish a connection with the AP. Channel access in an 802.11 system may include Carrier Sense Multiple Access with Collision Avoidance (CSMA/CA). In this mode of operation, every STA, including the AP, may sense the primary channel. If the channel is detected to be busy, the STA may "back off". Hence only one STA may transmit at any given time in a given BSS.

In 802.11n, High Throughput (HT) STAs may also use a 40 MHz wide channel for communication. This may be achieved by combining the primary 20 MHz channel, with an adjacent 20 MHz channel to form a 40 MHz wide contiguous channel.

In 802.11ac, Very High Throughput (VHT) STAs may support 20 MHz, 40 MHz, 80 MHz, and 160 MHz wide channels. The 40 MHz, and 80 MHz, channels may be formed by combining contiguous 20 MHz channels similar to 802.11n described above. A 160 MHz channel may be formed either by combining 8 contiguous 20 MHz channels, or by combining two non-contiguous 80 MHz channels, this may also be referred to as an 80+80 configuration. For the 80+80 configuration, the data, after channel encoding, may be passed through a segment parser that divides it into two streams. IFFT and time domain processing may be done on each stream separately, after which, the streams may be mapped on to the two channels, and the data may be transmitted. At the receiver, this mechanism is reversed, and the combined data is sent to the MAC.

Sub 1 GHz modes of operation may be supported by 802.11af, and 802.11ah. For these specifications the channel operating bandwidths, and carriers, may be reduced relative to those used in 802.11n, and 802.11ac. 802.11af may support 5 MHz, 10 MHz and 20 MHz bandwidths in the TV White Space (TVWS) spectrum, and 802.11ah may support 1 MHz, 2 MHz, 4 MHz, 8 MHz, and 16 MHz bandwidths using non-TVWS spectrum. A possible use case for 802.11ah is support for Meter Type Control (MTC) devices in a macro coverage area. MTC devices may have limited capabilities including only support for limited bandwidths, but may also include a requirement for a very long battery life.

WLAN systems which support multiple channels, and channel widths, such as 802.11n, 802.11ac, 802.11af, and 802.11ah, may include a channel which is designated as the primary channel. The primary channel may, but not necessarily, have a bandwidth equal to the largest common operating bandwidth supported by all STAs in the BSS. The bandwidth of the primary channel may therefore be limited by the STA, of all STAs in operating in a BSS, which supports the smallest bandwidth operating mode. In the example of 802.11ah, the primary channel may be 1 MHz wide if there are STAs (e.g. MTC type devices) that only support a 1 MHz mode even if the AP, and other STAs in the BSS, may support a 2 MHz, 4 MHz, 8 MHz, 16 MHz, or other channel bandwidth operating modes. All carrier sensing, and NAV settings, may depend on the status of the primary channel; i.e., if the primary channel is busy, for example, due to a STA supporting only a 1 MHz operating mode is transmitting to the AP, then the entire available frequency bands may be considered busy even though majority of it stays idle and available.

In the United States, at present, the available frequency bands which may be used by 802.11ah may be from 902 MHz to 928 MHz. In Korea, at present, the available frequency bands which may be used by 802.11ah may be from 917.5 MHz to 923.5 MHz; and in Japan, the available frequency bands which may be used by 802.11ah may be from 916.5 MHz to 927.5 MHz. The total bandwidth available for 802.11ah may be 6 MHz to 26 MHz depending on the country code.

IEEE 802.11™ High Efficiency WLAN (HEW) may include amendments to enhance the quality of service all users experience for a broad spectrum of wireless users in many usage scenarios including high-density scenarios in the 2.4 GHz, 5 GHz and 6 GHz band. New use cases which support dense deployments of APs, and STAs, and associated Radio Resource Management (RRM) technologies may be considered.

Potential applications for HEW may include emerging usage scenarios such as data delivery for stadium events, high user density scenarios such as train stations, or enterprise/retail environments, and also evidence for an increased dependence on video delivery, and wireless services for medical applications.

The measured traffic for a variety of applications may have a large likelihood of short packets, and network applications may also generate short packets. Such applications may include Virtual office; transmit power control (TPC) acknowledgement (ACK); video streaming ACK; Device/Controller (Mice, keyboards, Game controls, etc.); access—probe request/response; network selection—probe request, Access Network Query Protocol (ANQP); and/or network management—control frame applications.

802.11ax may include MU features that include UL and DL OFDMA and UL and DL multi-user MIMO (MU-MIMO). Designing and defining a mechanism for multiplexing UL random access for different purposes may be consider in the spec.

802.11ax may address medium access issues in the 6 GHz band, such as by using triggered or scheduled medium access only in the 6 GHz band, and/or restricting active scanning and having scheduled Enhanced Distributed Channel Access (EDCA) medium access in the 6 GHz band.

IEEE 802.11bc may include a MAC amendment to enhanced broadcast service (eBCS) for 802.11 devices. The IEEE 802.11bc amendment may not impact the current IEEE 802.11 PHY specifications.

eBCS service may include downlink from an AP to non-AP STAs or may include uplink from sensor non-AP STAs. Enhanced Broadcast Service may be provided to both STAs that are associated or un-associated with a particular AP. An AP may support up to 3000 non-AP STAs with eBCS service. In addition, there may be a class of low-cost non-AP STAs that consumes the eBCS service that may not be able to transmit directly to the AP.

Some example usage cases for eBCS may include stadium video broadcasting; automotive broadcasting; uplink sensor data broadcasting; museum information and multilingual broadcasting; and/or event producer information and content broadcasting.

In downlink broadcasting use cases, an eBCS AP may provide broadcasting services to STAs that are either associated with it or unassociated with the AP. Since broadcast frames may not be acknowledged, it may not always be clear whether there are any STAs that are utilizing the broadcast service and receiving the broadcast data. If broadcast data is not being received, the AP would be wasting both power as well as wireless medium resources. Some implementations provide a broadcast service mechanism to facilitate a broadcasting service which is power efficient and may only provide broadcast service when and/or if the service is being actively consumed.

For STAs that want to utilize downlink broadcast services provided by one or more APs, the STAs may be associated or unassociated with the APs that provide the broadcast services. Such STAs and APs may need to request broadcast service and negotiate parameters for the requested broadcast services. Some implementations include indication and negotiation procedures to support the broadcast service discovery and parameter negotiation.

Some implementations provide an End of Broadcast Service Announcement information element. In some implementations, an AP may transmit an End of Broadcast Service Announcement frame, or a frame that contains an End of Broadcast Service Announcement information element to announce that one or more eBCS Service is ending.

Example values for the various fields and subfields discussed herein are provided for illustration only, and it is noted that in other implementations, any other suitable value may be used to indicate the same information, or different information. For example, in some implementations, a bit value of 1 in a field may indicate certain information, whereas a bit value of 0 in the field may indicated this same information.

Figure 2:
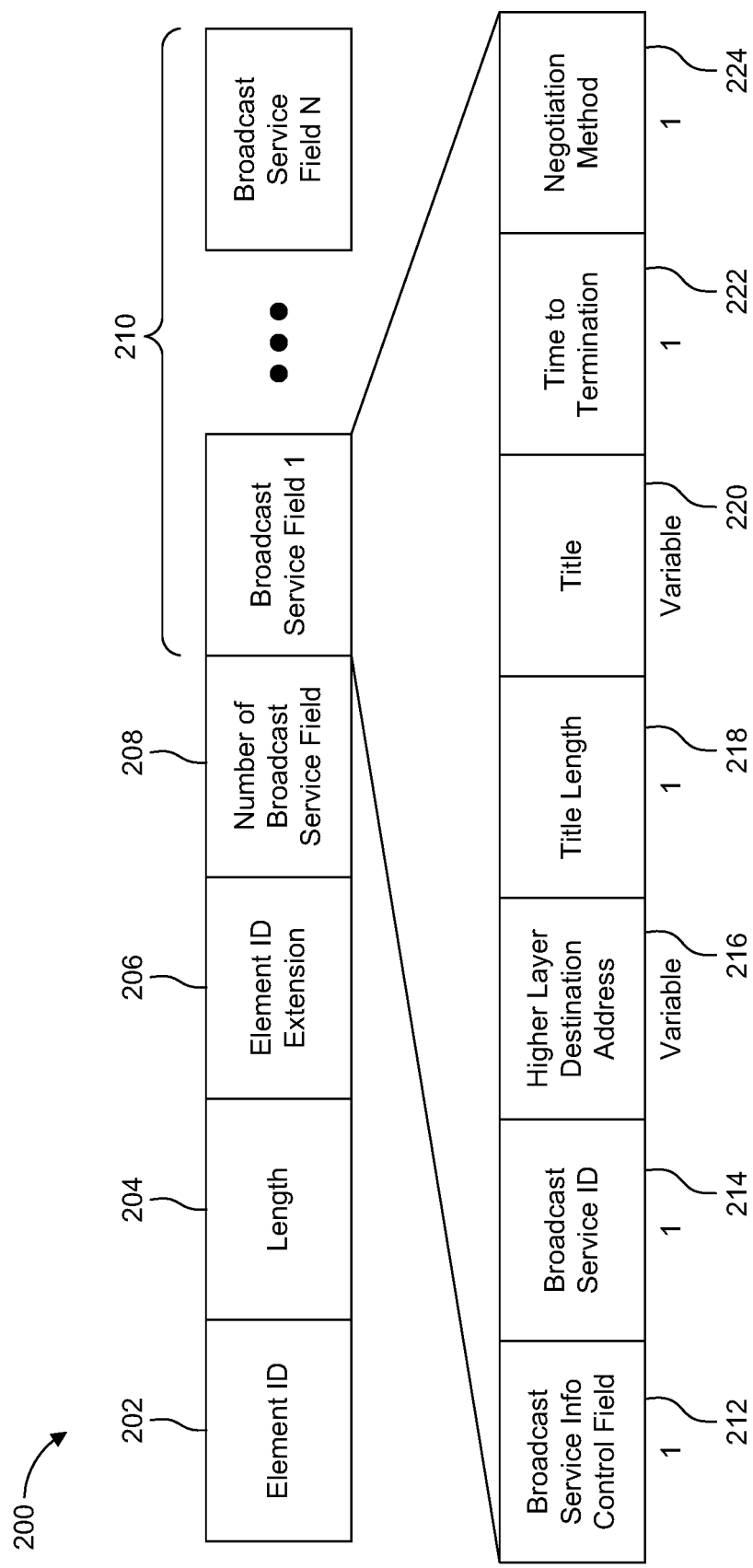
FIG. 2 is a diagram illustrating an example format of an End of Broadcast Service Announcement information element.

FIG. 2 is a bitmap diagram illustrating an example format of an End of Broadcast Service Announcement information element. The End of Broadcast Service Announcement information element may contain one or more of the following fields: Element identifier (ID) 202, Length 204, and Element ID Extension 206, Number of Broadcast Service field 208, and one or more Broadcast Service fields 210. The Element identifier (ID) field 202, Length field 204, and Element ID Extension field 206 may indicate that the current element is an End of Broadcast Service Announcement information element and may indicate the length of the current element. The Number of Broadcast Service fields 208 may indicate the number of Broadcast Service fields that the element includes. The one or more Broadcast Service fields 210, each of which may include the information of a particular Broadcast Service, including some or all of the fields described below for each broadcast service.

The one or more Broadcast Service fields 210 may have a format as shown in FIG. 2, and may include one or more of the following fields: Broadcast Service Information Control field 212; Broadcast Service ID field 214; Higher Layer Destination Address field 216; Title Length field 218; Title field 220; Time to Termination field 222; and/or Negotiation Method field 224. The Broadcast Service Information Control field 212; Broadcast Service ID field 214, Title Length field 218, Time to Termination field 222, and Negotiation Method field 224 may be 1 byte in length, while the Higher Layer Destination Address field 216 and Title field may be of variable byte length.

Figure 3:
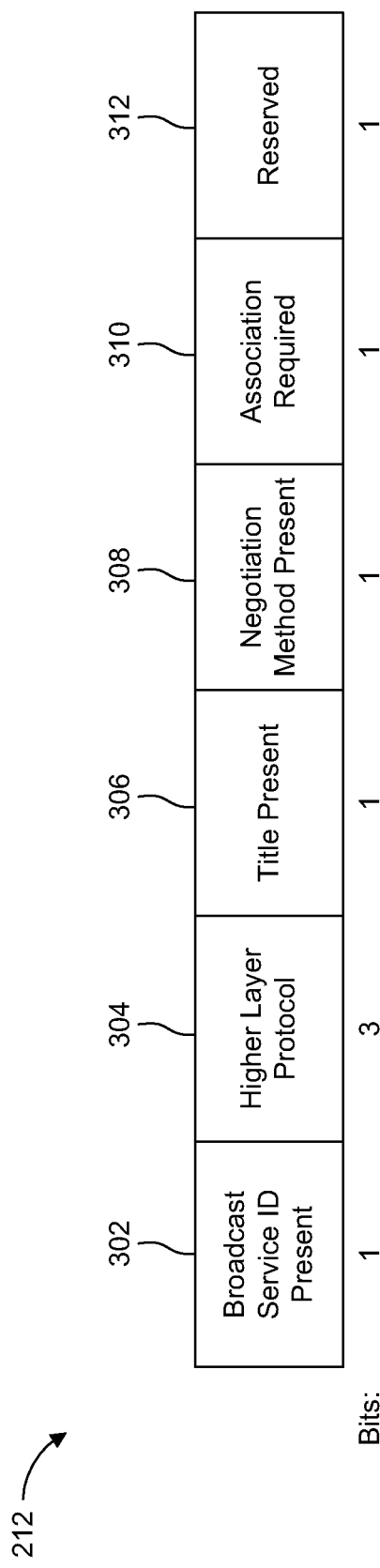
FIG. 3 is a diagram illustrating an example format of a Broadcast Service Info control field

FIG. 3 is a bitmap diagram illustrating an example format of a Broadcast Service Info Control field 212. The Broadcast Service Info Control field 212 may be 1 byte in length and may include indications of whether certain broadcast information is contained in the Broadcast Service Field 210. The Broadcast Service Info Control field 212 may include one of the following subfields: Broadcast Service ID Present subfield 302, Higher Layer Protocol subfield 304, Title Present subfield 306, Negotiation Method Present subfield 308, Association Required subfield 310, and Reserved subfield 312.

The Broadcast Service ID Present subfield 302 may be 1 bit of length and indicate whether Broadcast Service ID is included in the Broadcast Service Field. The Higher Layer Protocol subfield 304 may be three bits in length and may contain a value indicating that a Higher Layer Destination Address is not present or a Higher Layer Destination Address is present in the Broadcast Service field 210 and may contain a value indicating that a Higher Layer Destination Address present in the Broadcast Service Field 2010 may be an address associated with one of the Higher Layer Protocols UDP/IPv4; UDP/IPv6; UDP/Hostname; MPEG Transport Stream identifier; MAC Address; or Reserved.

A Title Present subfield 306 may be one bit in length and may indicate whether a user readable title is present in the Broadcast Service field 210. If the Title Present subfield 306 bit is set to 1, then a Title Length subfield 218 and a Title subfield 220 may be included in the Broadcast Service field 210. A Negotiation Method Present subfield 308 may be 1 bit in length and may indicate whether the Negotiation Method subfield 224 is included in the Broadcast Service field 210. An Association Required subfield 310 may be 1 bit in length and may indicate whether the Broadcast Service described by the current Broadcast Service field 210 requires association before it can be utilized by another STA.

Referring back to FIG. 2, the Broadcast Service ID subfield 214 may be 1 byte in length and may indicate the identifier of the Broadcast Service. The Higher Layer Destination Address subfield 216 may take different lengths, e.g., depending on the value indicated in the Higher Layer Protocol field of the Broadcast Service Info Control subfield. The Higher Layer Destination Address subfield 216 may contain the IP address and UDP port if IPv4/UDP or IPv6/UDP is indicated in the Higher Layer Protocol subfield 304.

A Higher Layer Destination Address subfield 216 may include a MAC address of 6 bytes if a MAC address is indicated in the Higher Layer Protocol subfield 304. The Higher Layer Destination Address may not be included in the Broadcast Service field 210 if the Higher layer Protocol subfield 304 indicates that no Higher Layer Destination Address field is present.

A Title Length subfield 218 may be included in the Broadcast Service field 210 if the Title Present subfield 306 in the Broadcast Service Info Control subfield 212 is set to 1; otherwise it may not be present. The Title Length subfield 218 may be 1 byte in length and may indicate the length of the Title subfield 220.

A Title subfield 220 may be included in the Broadcast Service field 210 if the Title Present subfield 306 in the Broadcast Service Info Control subfield 212 is set to 1; otherwise it may not be present. The Title Length subfield 218 may be 1 byte in length and may indicate the length of the Title subfield 220.

A Time to Termination subfield 222 may be used to indicate the remaining time left at which the Broadcast Service described in this Broadcast Service field 210 will terminate unless additional negotiation is conducted by one or more STAs that may consume the said Broadcast Service. In another example, the Time to Termination subfield 222 may include a time, for example, a timing synchronization function (TSF) time value, or other type of time, at which the said Broadcast Service will terminate unless additional negotiation is conducted by the initiator of the broadcast service or by other users of the said Broadcast Service. Additionally or alternatively, a Timestamp of current time, such as the current value of the TSF timer may be included.

A Negotiation Method subfield 224 may be included in the Broadcast Service field 210 if the Negotiation Method Present subfield 308 is set to 1 (or another suitable indication). The Negotiation Method subfield may be used to indicate the negotiation method that should be used to negotiate for the continuation of the broadcast service beyond the time of termination. The Negotiation Method subfield may contain one or more of the following values: Through Broadcast Service Request frames, Through ANQP/GAS Broadcast Service Request frames, and/or Through IP Request (in this case, the IP version and IP addresses that is needed for negotiation may be included).

In some implementations, any subset of fields or subfields of the End of Broadcast Service Announcement element 200 may be implemented in any field or subfield or a set or subset of fields of existing or newly designed elements or frames, or PHY and/or MAC headers of any management, control, data frames, or other headers, or other frames.

Some implementations provide an eBCS Service Termination Notice frame format. In some implementations, an eBCS Service Termination Notice frame is transmitted by a STA that is a transmitter of eBCS services to announce the termination of one or more of the eBCS services transmitted by the STA, e.g., an AP, or by other STAs.

Figure 4:
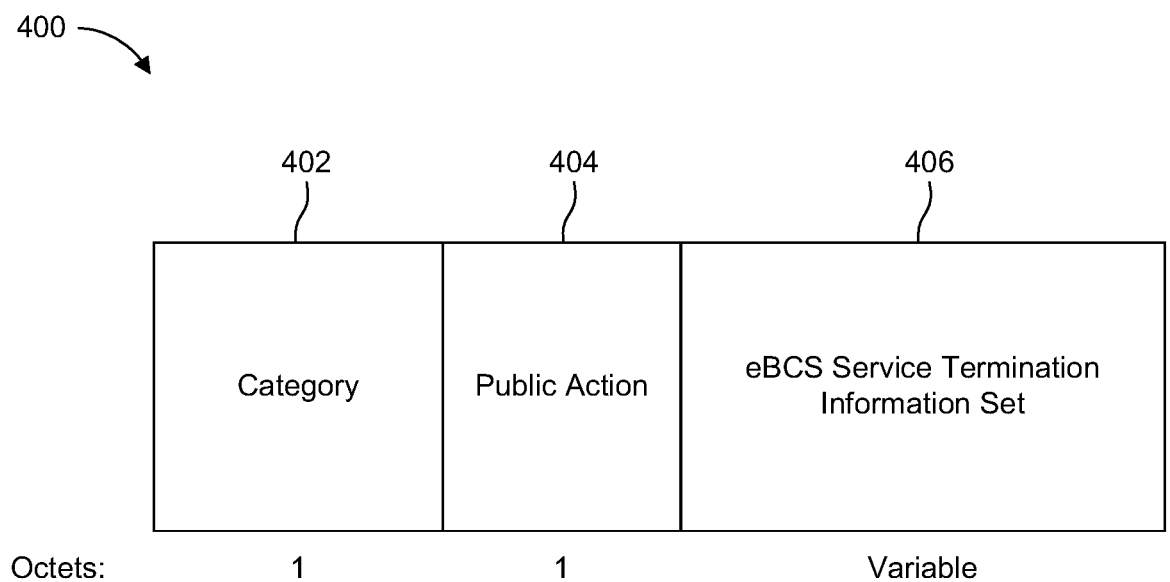
FIG. 4 is a diagram illustrating an example format of an eBCS Termination Notice frame Action field.

FIG. 4 is a diagram illustrating an example format of a eBCS Termination Notice Frame Action field 400. As illustrated in FIG. 4, the eBCS Termination Notice Frame Action field 400 may include a Category field 402, Public Action field 404, and/or eBCS Service Termination Information Set field 406. The Category field 402 and Public Action field 404 may be one octet in length while the eBCS Service Termination Information Set field 406 may be of variable length. In some implementations, the eBCS Service Termination Information Set field 406 includes one or more of eBCS Service Termination Info subfields 500.

Figure 5:
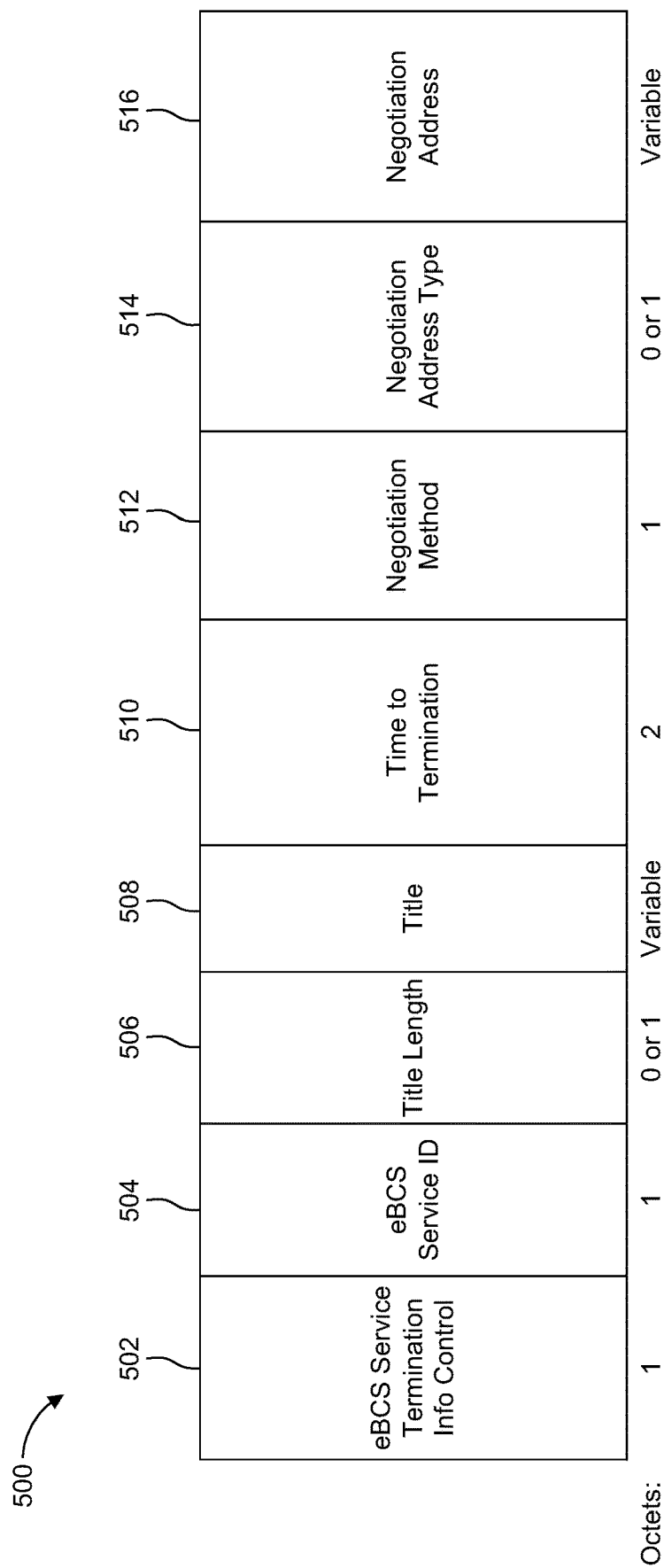
FIG. 5 is a diagram illustrating an example format of an eBCS Service Termination Info subfield.

FIG. 5 is a diagram illustrating an example format of an eBCS Service Termination Info subfield 500. As shown in FIG. 5, the eBCS Service Termination Information Set field 406 may include one or more of an eBCS Service Termination Information Control subfield 502, eBCS Service ID subfield 504, Title Length subfield 506, Title subfield 508, Time to Termination subfield 510, Negotiation Method subfield 512, Negotiation Address type subfield 514, and/or Negotiation Address subfield 516.

The eBCS Service Termination Information Control subfield 502, eBCS Service ID subfield 504, and Negotiation Method subfield 512 may have a octet length of 1, while the Title Length subfield 506 and Negotiation Method subfield 514 may have a octet length of 0 or 1. The Time to Termination subfield 510 may have an octet length of 2. The Title subfield 508 and Negotiation Address subfield 516 may be of variable octet length.

Figure 6:
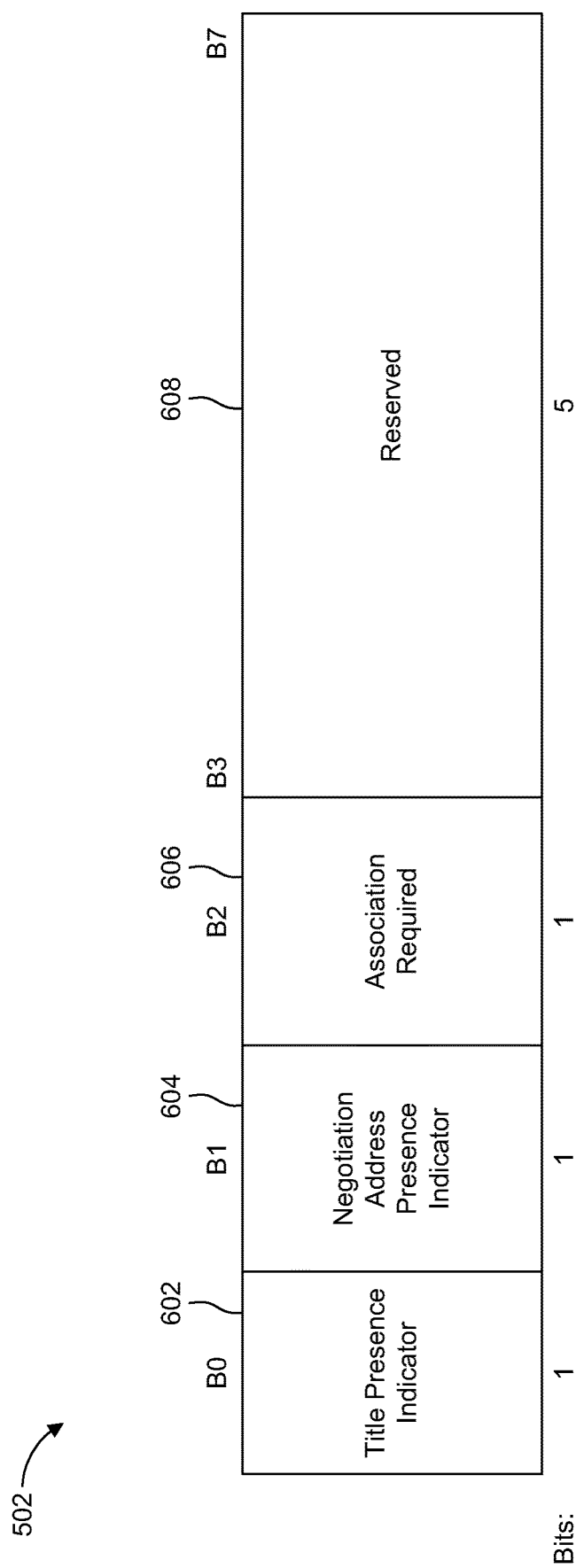
FIG. 6 is a diagram illustrating an example format of an eBCS Service Termination Info Control subfield.

FIG. 6 is a diagram illustrating an example format of the eBCS Service Termination Info Control subfield 502. As shown in FIG. 6, the eBCS Service Termination Info Control subfield 502 may include a Title Presence Indicator subfield 602, a Negotiation Address Presence Indicator subfield 604, an Association Required subfield 606, and/or reserved subfields 608.

In one example, a value of 1 in the Title Presence Indicator subfield 602 indicates that a Title Length subfield 506 and a Title subfield 508 are present in the same eBCS Service Termination Info subfield. In one example, a value of 0 in the Title Presence Indicator subfield 602 indicates that a Title Length subfield 506 and a Title subfield 508 are not present in the same eBCS Service Termination Information subfield. In one example, a value of 1 in the Negotiation Address Presence Indicator subfield 604 indicates that a Negotiation Address Type subfield 514 and a Negotiation Address subfield 516 are present in the same eBCS Service Termination Info subfield. In one example, a value of 0 indicates that a Negotiation Address Type subfield 514 and a Negotiation Address subfield 516 are not present in the same eBCS Service Termination Info subfield. In one example, a value of 1 in the Association Required subfield 606 indicates that association is required to consume the eBCS service identified by the eBCS Service ID contained in the eBCS Service ID subfield 504. In one example, a value of 0 indicates that association is not required to consume the eBCS service identified by the eBCS Service ID included in the eBCS Service ID subfield 504.

Referring back to FIG. 5, in some implementations, the eBCS Service ID subfield 504 is 1 octet in length. In some implementations, the eBCS Service ID subfield 504 indicates the ID of the eBCS service to be terminated. In some implementations, the Title Length subfield 506 is 1 octet in length. In some implementations, the Title Length subfield 506 indicates the length of the Title subfield 508 in octets. In some implementations, the Title subfield 508 indicates the Title of the eBCS Service identified by the eBCS Service ID contained in the eBCS Service ID subfield 504. In some implementations, the Title subfield 508 indicates the Title in 8-bit Unicode Transformation Format (UTF-8) format. In some implementations, the Time to Termination subfield 510 is 2 octets in length. In some implementations, the Time to Termination subfield 510 indicates the number of TBTTs until the eBCS Service identified by the eBCS Service ID contained in the eBCS Service ID subfield 504 is terminated. In some implementations, the Time to Termination subfield 510 may be indicated in other time format, such as milliseconds (ms), microseconds (us), Time Units (TUs), or any other type of time units. In some implementations, the value 0 indicates that the eBCS Service identified by the eBCS Service ID in the same eBCS Service ID subfield 504 has no specific termination time. In some implementations, some other value, for example, the maximal value of the Time to Termination subfield indicates that the eBCS Service identified by the eBCS Service ID in the same eBCS Service ID subfield 504 has no specific termination time, or indicates that the eBCS Service identified by the eBCS Service ID in the same eBCS Service ID subfield 504 has a termination time that is larger than the maximal value that can be contained by the Time To Termination subfield 510.

In some implementations, the Negotiation Method subfield 512 is 1 octet in length. In some implementations, the Negotiation Method subfield 512 indicates the negotiation method to negotiate extension of the eBCS service identified by the eBCS Service ID contained in the eBCS Service ID subfield 504. Example encoding of the Negotiation Method subfield 512 is defined in Table 1 below. Other values may be used to indicate the same Negotiation Method as detailed in Table 1.

TABLE 1

Negotiation Method subfield encoding

| Negotiation Method subfield value | Meaning |
| --- | --- |
| 0 | No Negotiation |
| 1 | Negotiation through eBCS Service Request frames |
| 2 | Negotiation through ANQP/GAS eBCS Service Request frames |
| 3 | Negotiation through IP Request |
| 4-7 | Reserved |

In some implementations, the Negotiation Address Type subfield 514 is 1 octet in length. In some implementations, the Negotiation Address Type subfield 514 indicates the type of the address included in the Negotiation Address subfield 516. Example encoding of the Negotiation Address Type subfield 514 is defined in Table 2.

TABLE 2

Negotiation Address Type subfield encoding

| Negotiation Address Type value | Meaning |
|---|---|
| 0 | MAC Address |
| 1 | UDP/IPv4 Address |
| 2 | UDP/IPv6 Address |
| 3 | UDP/Hostname |
| 4 | MPEG transport Stream Identifier |
| 5-7 | Reserved |

In some implementations, the Negotiation Address subfield 516 indicates the address to be used for negotiating for the extension of the eBCS service identified by the eBCS Service ID contained in the eBCS Service ID subfield 504. In some implementations, the format and the length of the Negotiation Address subfield 516 depends on the value contained in the Negotiation Address Type subfield 514. In some implementations, the Negotiation Address subfield 516 contains a MAC address, e.g., if the Negotiation Address Type is equal to 0.

Figure 7:
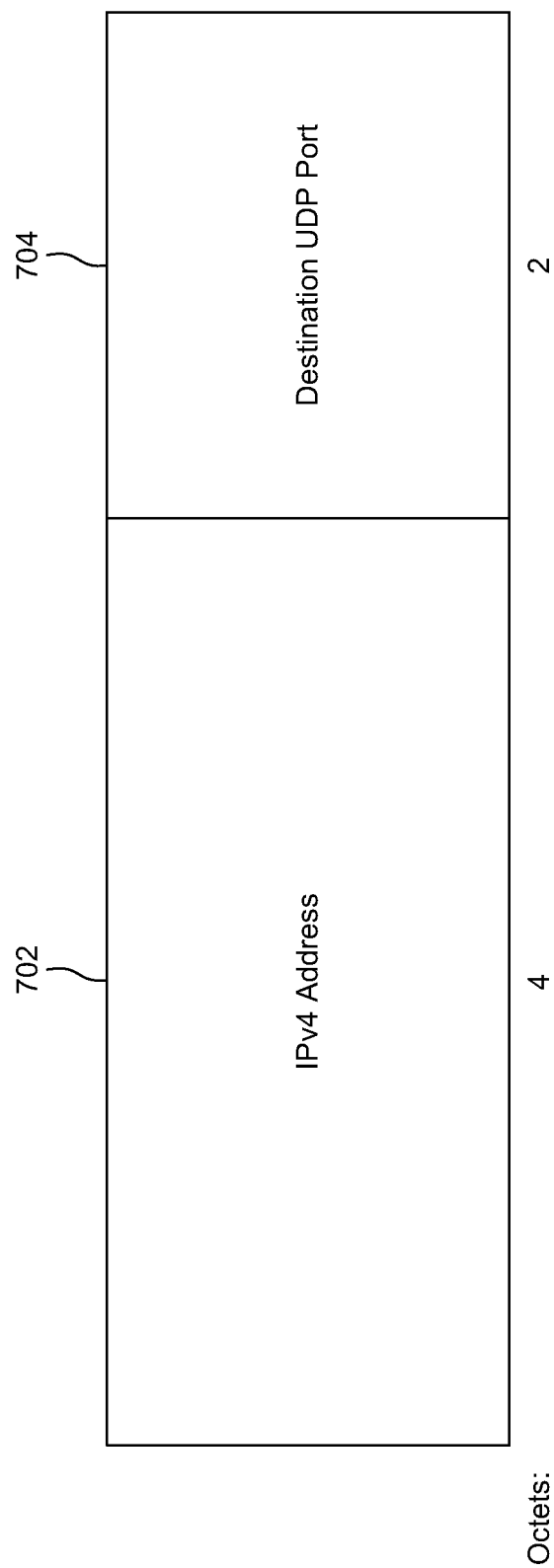
FIG. 7 is a diagram illustrating an example format of a Negotiation Address subfield.

FIG. 7 is a diagram illustrating an example format of the Negotiation Address subfield 516, e.g., when the Negotiation Address Type is equal to 1 (or another suitable value indicating this). In some implementations, the IPv4 Address subfield 702 indicates an IPv4 address used for negotiating the extension of the eBCS service. In some implementations, the Destination UDP Port subfield 704 indicates the UDP Port associated with the IPv4 address indicated in the IPv4 Address subfield 702 in little endian format.

Figure 8:
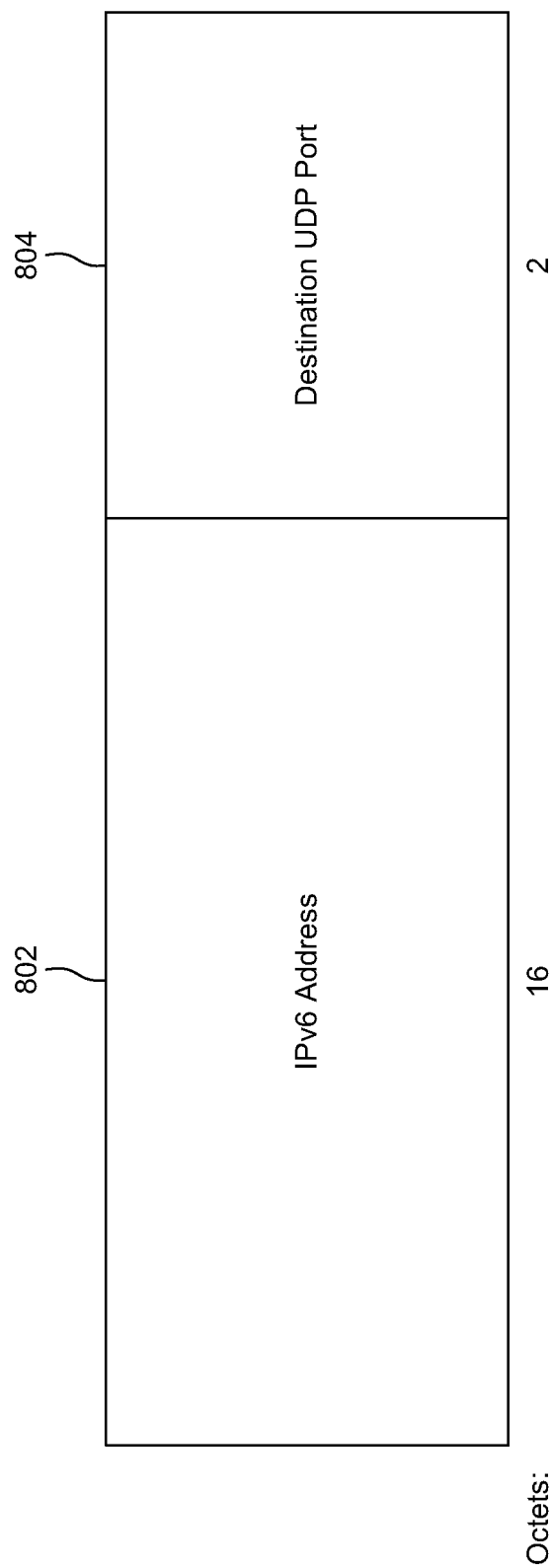
FIG. 8 is a diagram illustrating an example format of a Negotiation Address subfield.

FIG. 8 is a diagram illustrating an example format of the Negotiation Address subfield 516, e.g., when the Negotiation Address Type is equal to 2 (or another suitable value indicating this). In some implementations, the IPv6 Address subfield 802 indicates an IPv6 address used for negotiating the extension of the eBCS service. In some implementations, the Destination UDP Port subfield 804 indicates the UDP Port associated with the IPv6 address indicated in the IPv6 Address subfield 802 in little endian format.

Figure 9:
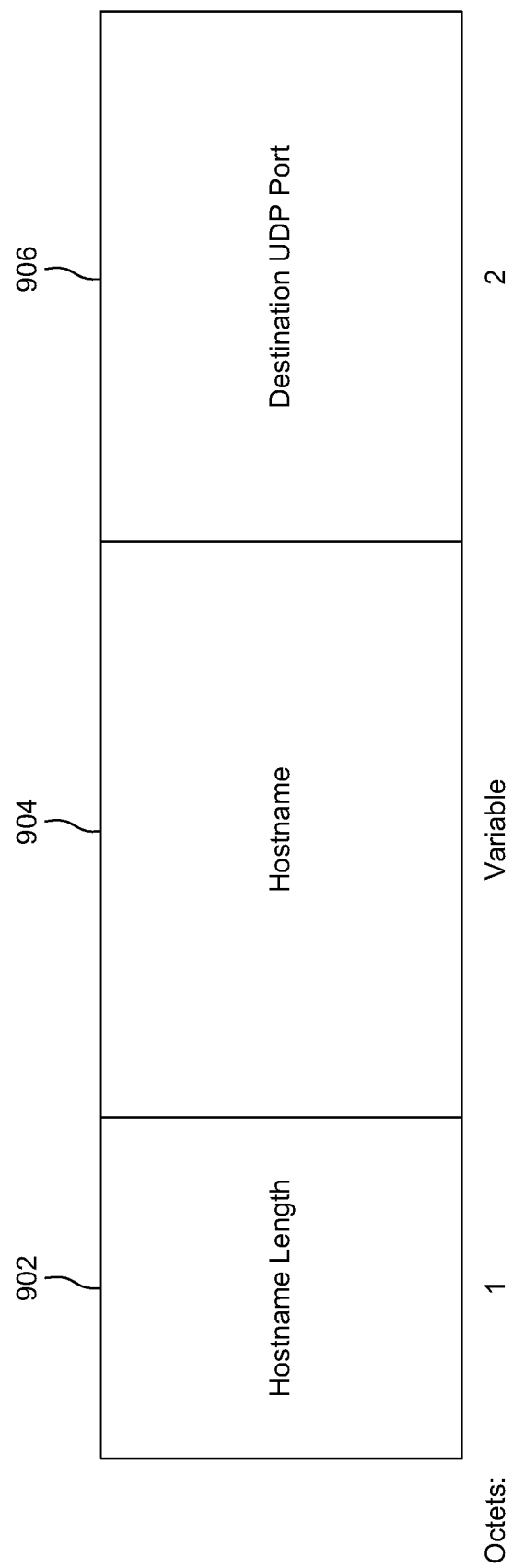
FIG. 9 is a diagram illustrating an example format of a Negotiation Address subfield.

FIG. 9 is a diagram illustrating an example format of the Negotiation Address subfield 516, e.g., when the Negotiation Address Type is equal to 3 (or another suitable value indicating this). In some implementations, the Hostname Length subfield 902 indicates the length of the Hostname subfield, e.g., in octets. In some implementations, the Hostname subfield 904 indicates the host name for negotiating the extension of the eBCS service, e.g., in UTF-8 format. In some implementations, the Destination UDP Port subfield 906 indicates the UDP Port associated with the host name indicated in the Hostname subfield, e.g., in little endian format.

Figure 10:
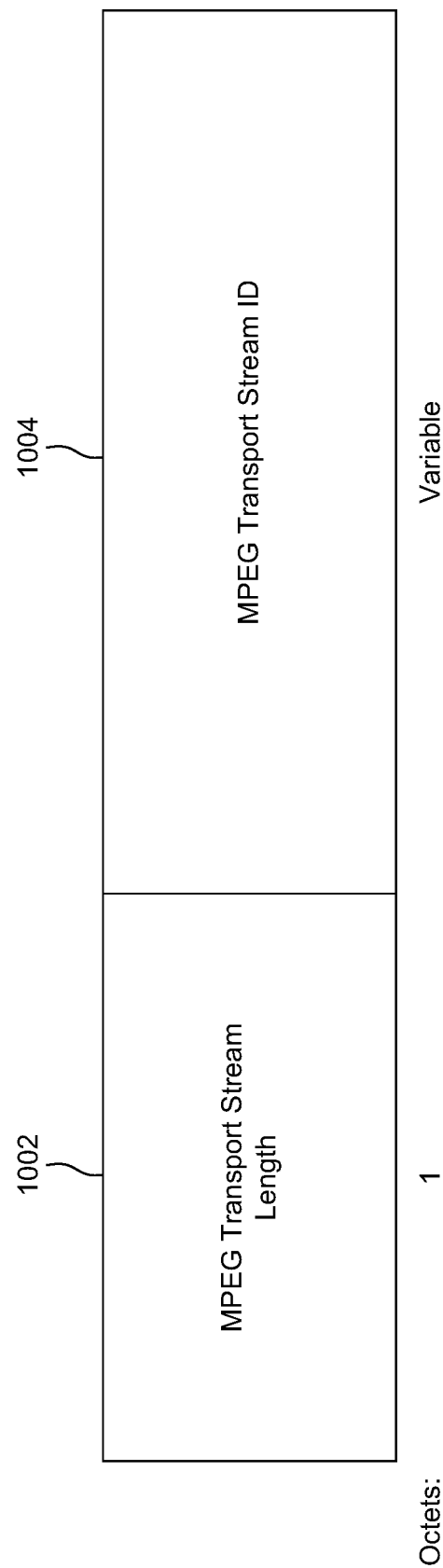
FIG. 10 is a diagram illustrating an example format of a Negotiation Address subfield.

FIG. 10 is a diagram illustrating an example format of the Negotiation Address subfield 516, e.g., when the Negotiation Address Type is equal to 4 (or another suitable value indicating this). In some implementations, the MPEG Transport Stream Length subfield 1002 indicates the length of the MPEG Transport Stream ID subfield 1004, e.g., in octets. In some implementations, the MPEG Transport Stream ID subfield 1004 indicates the MPEG Transport Stream ID, e.g., in UTF-8 format.

Some implementations include an End of Broadcast Service Announcement indication Procedure. In some implementations, the End of Broadcast Service Announcement Indication Procedure for DL broadcast service may be as follows.

An AP may advertise a broadcast service using a Broadcast Service element in its beacon, probe responses, eBCS Service Advertisement frames, and/or eBCS info frames, etc. Some Broadcast Services may be allocated specific time and/or frequency resources. These time and frequency resources may be broadcast with certain periodicities.

A Broadcast Service may be requested by a STA which may be associated or unassociated with the AP, or by STAs that may request the broadcast service through other means, such as through IP protocols. When the Broadcast Service is being requested, a STA may request the Broadcast Service for a certain period of time. For example, the STA may request video playback for 10 minutes. STAs requesting the same or similar services may be grouped by the AP. Broadcast Service periodicities may be modified by the AP based upon explicit or implicit STA or STA group demand.

The AP may indicate the remaining time of a broadcast service that it is providing by including, (e.g., periodically) an End of Broadcast Service Announcement element, in one or more of frames that it is transmitting (e.g., in beacon frames, probe response frames, eBCS data frames, Broadcast Service Request frames, eBCS Service Advertisement frames, and/or eBCS Info frames, etc.)

The AP may indicate that one or more broadcast services that it is providing are ending at a given time, e.g., by including one or more End of Broadcast Service Announcement elements in one or more of frames that it is transmitting (e.g., in beacon frames, probe response frames, eBCS data frames, Broadcast Service Request frames, eBCS Service Advertisement frames, or eBCS Info frames, etc.) The AP may include a Negotiation Method needed for any STAs that are interested in the continuation of the broadcast service beyond the time of termination to conduct negotiation for the broadcast service beyond the indicated time of termination. The AP may indicate that one or more broadcast services that it is providing will be broadcast with specific periodicities before they end.

A STA that is utilizing a broadcast service, or plans to utilize a broadcast service, may receive one or more frames that may contain an End of Broadcast Service Announcement information, or element, for the broadcast service. If the STA desires to utilize the broadcast service beyond the indicated time of termination, it may follow the Negotiation Method indicated by the AP to conduct negotiations with the AP for the continuation of the broadcast service.

If a broadcast service requires association (e.g., as indicated in the Association Required subfield), and the Negotiation is through Broadcast Service Request frames, the STA may conduct an association procedure with the AP. If the STA is already associated with the AP, it may send a Broadcast Service Request frame indicating that it desires one or more broadcast service. The STA may indicate that it desires one or more broadcast service for a certain period of time or with a certain periodicity. The AP may respond with a Broadcast Service Response frame indicating that the broadcast service will be continued for an longer period of time and/or periodicity. If a second STA desires the same broadcast service, and it receives a frame containing an End of Broadcast Service Announcement element or information indicating that the broadcast service has been extended, it may cancel any pending Broadcast Service Request frames that it plans to send to the AP.

If a broadcast service does not require association (e.g., as indicated in the Association Required subfield), and the Negotiation is through ANQP/GAS Broadcast Service Request frames, the STA may send an ANQP/generic advertisement service (GAS) Broadcast Service Request frame indicating that it desires one or more broadcast service or register for one or more broadcast services. The STA may indicate that it desires, or may register for, one or more broadcast service for a certain period of time. The AP may respond with an ANQP/GAS Broadcast Service Response frame indicating that the broadcast service will be continued for an longer period of time. If a second STA desires the same broadcast service, and it received a frame containing an End of Broadcast Service Announcement element or information indicating that the broadcast service has been extended, it may cancel any pending ANQP/GAS Broadcast Service Request frames that it plans to send to the AP.

If a broadcast service does not require association (e.g., as indicated in the Association Required subfield), and the Negotiation is through IP protocols (e.g., IPv4 and IPv6 and with appropriate IP addresses), the STA may send an IP packet, possibly through another interface indicating that it desires one or more broadcast service or register for one or more broadcast services. The STA may indicate that it desires or register for one or more broadcast service for a certain period of time. The AP may send a ANQP/GAS Broadcast Service Response frame, or eBCS Info frame, or beacon frames or eBCS Service Advertisement frames or any other frames with an End of Broadcast Service Announcement frame, indicating that the broadcast service will be continued for an longer period of time. If a second STA desires the same broadcast service, and it received a frame containing an End of Broadcast Service Announcement element or information indicating that the broadcast service has been extended, it may cancel any pending IP packets requesting continued broadcast service.

Some implementations provide an eBCS Service Termination Notice Procedure. In some implementations, the eBCS Service Termination Notice Procedure allows a STA that is a broadcaster of eBCS services to indicate that one or more eBCS services that it is broadcasting is to be terminated. In some implementations, the eBCS Service Termination Notice Procedure allows a STA that is a broadcaster of eBCS services to indicate that one or more eBCS services that is broadcasting is to be terminated. In some implementations, the eBCS Service Termination Notice Procedure allows a STA to indicate that one or more eBCS services that one or more other STAs are broadcasting is to be terminated.

In some implementations, an eBCS STA that is the broadcaster of one or more eBCS services shall start to transmit eBCS Service Termination Notice frames if one or more eBCS Services that it is transmitting will terminate within an interval, e.g., that is equal to or shorter than a time, such as dot11eBCSTerminationNoticeTime, if the STA is not periodically transmitting a schedule for the eBCS services that are to be terminated. In some implementations, an eBCS STA shall start to transmit eBCS Service Termination Notice frames if one or more eBCS Services will terminate within an interval, e.g., that is equal to or shorter than a time, such as dot11eBCSTerminationNoticeTime, if the STA is not periodically transmitting a schedule for the eBCS services that are to be terminated. In some implementations, an eBCS STA shall start to transmit eBCS Service Termination Notice frames if one or more eBCS Services will terminate within an interval, e.g., that is equal to or shorter than a time, such as dot11eBCSTerminationNoticeTime. In some implementations, if the eBCS STA starts to transmit eBCS Service Termination Notice frames, the STA shall transmit the eBCS Service Termination Notice frames with a period, e.g., that is larger than a minimum interval, such as dot11eBCSTerminationNoticeMinimumInterval and smaller than a maximum interval, such as dot11eBCSTerminationNoticeMaximumInterval.

In some implementations, an eBCS STA transmitting an eBCS Service Termination Notice frame indicates in the Time to Termination subfield in a eBCS Service Termination Info subfield the number of TBTTs before the eBCS service identified by the eBCS Service ID contained in the eBCS Service ID subfield in the same eBCS Service Termination Info subfield terminates. In some implementation, the Time to Termination subfield may be indicated in other time format, such as ms, us, Time Units (TUs), or any other type of time units.

In some implementations, an eBCS STA transmitting an eBCS Service Termination Notice frame shall indicate in the Negotiation Method subfield in a eBCS Service Termination Info subfield the negotiation method that a STA should use to negotiate for the extension of the eBCS service identified by the eBCS Service ID contained in the eBCS Service ID subfield in the same eBCS Service Termination Info subfield. In some implementation, the eBCS STA may indicate that no negotiation is available.

In some implementations, an eBCS STA transmitting an eBCS Service Termination Notice frame may indicate in the Negotiation Address subfield in an eBCS Service Termination Info subfield the address associated with the negotiation method indicated in the Negotiation Method subfield in the same eBCS Service Termination Info subfield that a STA should use to negotiate for the extension of the eBCS service identified by the eBCS Service ID contained in the eBCS Service ID subfield in the same eBCS Service Termination Info subfield.

In some implementations, after transmitting a eBCS Service Termination Notice frame, an eBCS STA shall transmit an eBCS Service Termination Notice frame with an updated value in the Time to Termination subfield in an eBCS Service Termination Info subfield if the eBCS Service identified by the eBCS Service ID in the eBCS Service ID subfield in the same eBCS Service Termination Info subfield has been negotiated to another duration or with a new Time to Termination value. In some implementations, if the negotiated duration for the eBCS service is longer than the maximum Time to Termination subfield value, the transmitting STA shall set the Time to Termination subfield to 0. In some implementations, if the negotiated duration for the eBCS service is longer than the maximum Time to Termination subfield value, the transmitting STA shall set the Time to Termination to the maximum value of the Time to Termination subfield. In some implementations, if the negotiated duration for the eBCS service is longer than the maximum Time to Termination subfield value, the transmitting STA shall set the Time to Termination subfield to some specific value N.

In some implementations, after transmitting a eBCS Service Termination Notice frame, an eBCS STA shall transmit an eBCS Service Info frame or other type of frames with an updated value in the Time to Termination subfield or eBCS Service Duration subfield if the eBCS has been negotiated to another duration or with a new Time to Termination value.

In some implementations, an eBCS STA that receives an eBCS Service Termination Notice frame may negotiate for the extension of an eBCS service e.g., if the eBCS service indicated in one of the eBCS Service Termination Info subfield terminates earlier than desired. In some implementations, the eBCS STA may negotiate the extension of the eBCS service, e.g., using the negotiation method as indicated in the Negotiation Method in the eBCS Service Termination Info subfield and in some implementations may follow the procedures defined in 802.11 specifications, e.g., 11.22.6.x (eBCS Service Negotiation Procedure for Associated STAs) and 11.23.3.3 (ANQP Procedures).

In some implementations, an eBCS STA that receives an eBCS Service Info frame or any other time of frames may negotiate for the extension of an eBCS service e.g., if the eBCS service terminates earlier than desired. In some implementations, the eBCS STA may negotiate the extension of the eBCS service, e.g., using the negotiation method as indicated in the Negotiation Method in the eBCS Service Termination Info subfield and in some implementations may follow the procedures defined in 802.11 specifications, e.g., 11.22.6.x (eBCS Service Negotiation Procedure for Associated STAs) and 11.23.3.3 (ANQP Procedures).

In some implementations, an eBCS STA shall skip the transmission of any eBCS Service Request frame or a frame containing an Enhanced Broadcast Request ANQP-element or any frames that contains IP frames requesting an eBCS service if the STA receives an eBCS Service Termination Notice frame with an acceptable Time to Termination value or duration values contained in the eBCS Service Termination Info subfield containing the eBCS Service ID of the eBCS service, or contained in eBCS Service Info frame or other type of frames for the same eBCS service.

Some implementations include an End of Broadcast Service Announcement Indication Procedure with triggering mechanisms. In some implementations, after transmission, by an AP, of an end of broadcast service announcement indication (EBSAI) through management or control frame (s), or aggregated with any type of frame(s), a STAs which may intend to keep current services or negotiate new broadcast services may respond. More than one STAs may need to transmit response to EBSAI.

Figure 11:
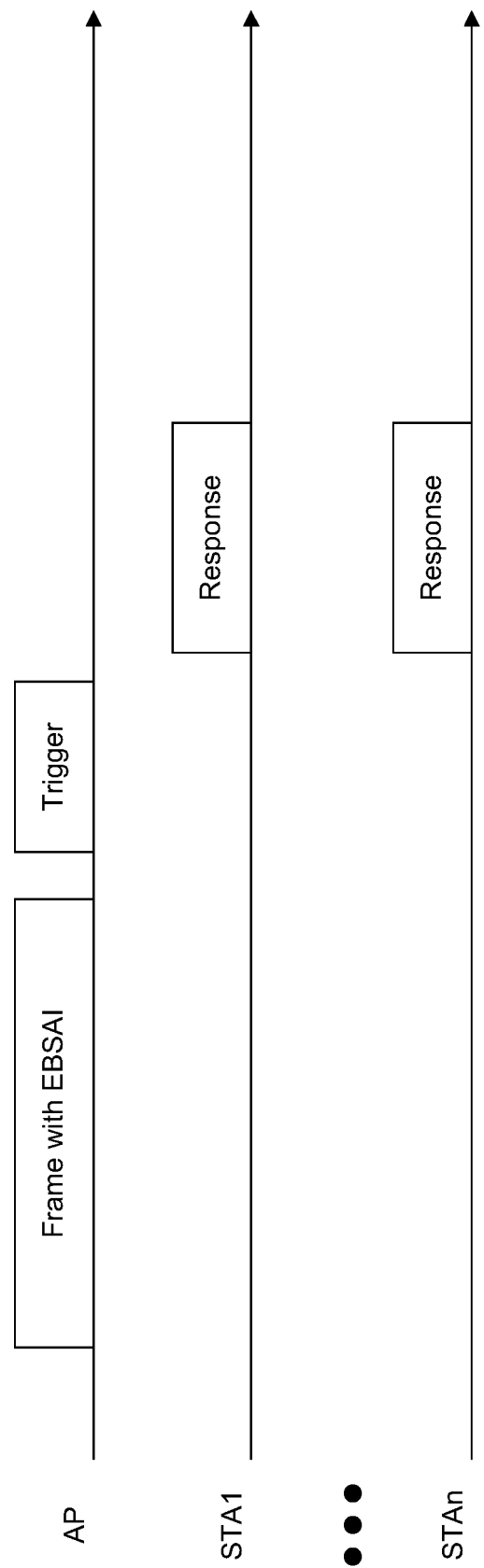
FIG. 11 is a signal diagram illustrating an example multiple access procedure.

FIG. 11 is a signal diagram illustrating an example multiple access procedure. As shown in FIG. 11, an AP may transmit a frame with EBSAI. The detailed frame format may be as described herein, e.g., regarding the end of broadcast service announcement information element and/or end of broadcast service announcement indication procedure.

The AP may expect one or more STA to transmit a response frame. The AP may transmit a trigger frame to trigger multiple access response transmission. In some implementations, the trigger frame may be transmitted an interframe space (xIFS) time after the frame with EBSAI. Here xIFS may refer to any existing interframe space or newly defined interframe space. In some implementations, the trigger frame may be aggregated with the frame with EBSAI. The trigger frame may indicate a trigger type in a trigger type field. The trigger type field may indicate a newly defined type, e.g., EBSAI, NDP, or Probe Request management frame trigger etc. Alternatively, the trigger type field may indicate an existing trigger type, e.g., basic trigger etc.

One or more STAs may transmit response to EBSAI, such that the STA may keep the originally negotiated broadcast services, may modify the originally negotiated broadcast services, e.g. to continue service beyond the time of termination, and/or may request to start a new broadcast negotiation for a certain period of time and periodicity.

The STAs may transmit the EBSAI response using one or more of an identical response method, a trigger based random access method, and/or a trigger based Probe Request method.

In an example identical response method, a common end of broadcast respond frame/field/element/PPDU may be defined, such that STAs which may intend to respond may transmit identical physical layer packets concurrently. The AP may be able to detect the concurrent transmissions from STAs, e.g., since they are identical.

In some implementations, e.g., of the identical response method, the STAs may be able to indicate single message (e.g., they prefer keeping the originally negotiated broadcast services). In some implementations, a null data packet (NDP) EBSAI response PPDU may be used for this kind of EBSAI response. The NDP EBSAI response PPDU may carry short training field (STF) and long training field (LTF) and signal training field (SIG) fields (In addition, legacy preamble fields may be prepended for backward compatibility). SIG fields may be modified to indicate that the STAs may prefer keeping the original negotiation. Alternatively, the SIG field may be omitted and the present NDP transmission may indicate the STAs prefer keeping the original setting. The PPDU may be transmitted xIFS after the trigger frame by one or more STAs. With this method, the STAs, which may like to terminate the broadcast service(s), may not need to respond and STAs, which may like to continue the broadcast service(s) may respond.

In some implementations, e.g., of the identical response method, the STAs may be able to carry several messages, (e.g., M messages.) Examples of such messages may include keeping the original negotiation, modifying the original negotiation, starting a new negotiation etc. In one design, a NDP EBSAI response PPDU may be used for this kind of EBSAI response. The NDP EBSAI response PPDU may carry STF and LTF and SIG fields (legacy preamble fields may be prepended for backward compatibility). Some of above mentioned fields may be transmitted in partial bandwidth. The location of the transmission may indicate the message it may carried. For example, the entire bandwidth may be partitioned to M chunks. If the STF and/or LTF and/or SIG field(s) may be transmitted over the first frequency chunk, it may indicate the first message. If the STF and/or LTF and/or SIG field(s) may be transmitted over the second frequency chunk, it may indicate the second message, and so on. The PPDU may be transmitted xSIF right after the trigger frame. In one method, the mapping of the frequency resources and message may be predefined and no signaling needed. In one method, the mapping of the frequency resources and message may be carried in the Trigger frame.

In an example trigger based random access method, one or more of resource units may be allocated for response transmission. The resource allocation may be included in the trigger frame. STAs may start an OFDMA random access procedure to select one or more resource units to transmit its own response frame. The response frame may be a normal MAC frame, which may carry a transmit (Tx) and/or receive (Rx) address, and other fields normally defined in a MAC header. Moreover, it may carry EBSAI response related information.

In an example trigger based probe request method, one or more of resource units may be allocated for this response transmission. The resource allocation may be included in the trigger frame. Unassociated STAs may use Probe Request management frames to select one or more resource units to transmit the frame. This response frame may contain additional information beyond what is currently available in these management frames to negotiate/renegotiate broadcast services.

Some implementations provide an eBCS Service Capability indication. In some implementations, an AP may include a eBCS Service Capability element in any frames that it transmits, such as a probe responses, beacon frames, eBCS Service Advertisement frames, eBCS Info frames, FILS Discovery frames, etc.

Figure 12:
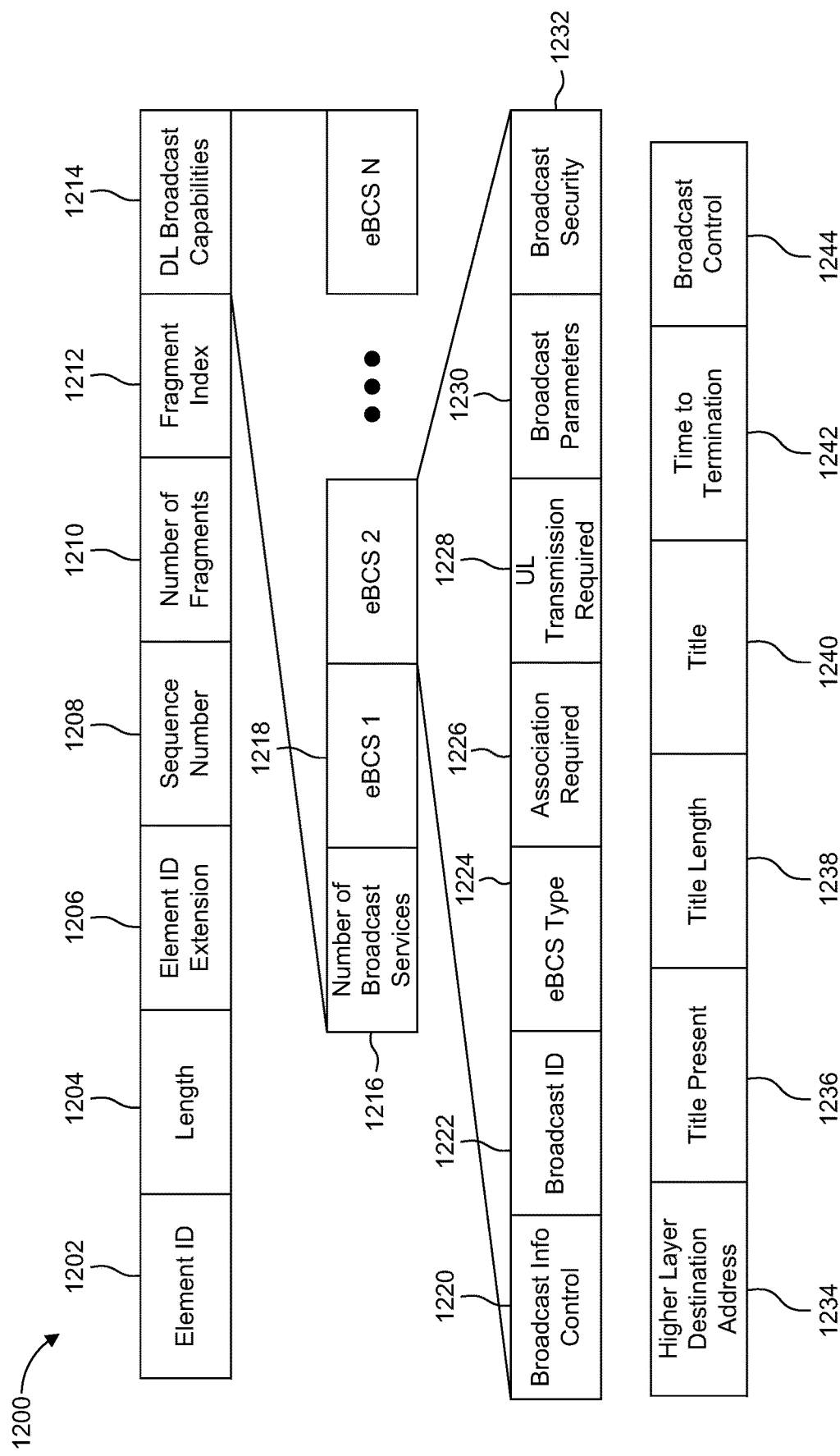
FIG. 12 is a diagram illustrating an example format of an eBCS Service Capabilities element.

FIG. 12 is a bitmap diagram illustrating an example format of an eBCS Service Capabilities element. The eBCS Service Capabilities element may contain one or more the following subfields: Element ID subfield 1202, Length subfield 1204, Element ID Extension subfield 1206, Sequence Number subfield 1208, Number of Fragments subfield 1210, Fragment Index subfield 1212, DL Broadcast Capabilities subframe 1214, Number of Broadcast Services subframe 1216, eBCS 1-N subfields 1218, Broadcast Info Control subfield 1220, Broadcast ID subfield 1222, eBCS subfield 1224, Association Required subfield 1226, UL Transmission Required subfield 1228, Broadcast Parameters subfield 1230, Broadcast Security subfield 1232, Higher Layer Destination Address subfield 1234, Title Present subfield 1236, Title Length subfield 1228, Title subfield 1240, Time to Termination subfield 1242, Broadcast Control subfield 1244, and/or other subfields, e.g., as arranged in FIG. 12 or otherwise. Descriptions of examples of such subfields are as follows.

For the Element ID subfield 1202, Length subfield 1204, and Element ID Extension subfield 1206, the combination of the Element ID and Element ID Extension may identify the current element as the DL Broadcast Capabilities element, or as DL eBCS element. The Length subfield 1204 may indicate the length of the element.

The Sequence Number subfield 1208 may indicate the sequence number of the eBCS Service Capabilities element The Number of Fragments: subfield 1210 may indicate the number of fragments that the eBCS Capabilities element identified by the Sequence Number may be partitioned into.

The Fragment Index subfield 1212 may indicate the index of the fragment of the eBCS Capabilities element that is contained in the current eBCS Capabilities element.

The eBCS 1-N subfields 1218 may include N subfields which may be contained in the Broadcast element where each field may be used to specify a particular Broadcast service that is provided by the transmitting STA, e.g., the transmitting AP. Each eBCS field may contain one or more of the following subfields: Broadcast Info Control subfield 1220; Broadcast ID subfield 1222; eBCS Type subfield 1224; Association Required subfield 1226; UL Transmission Required subfield 1228; Broadcast Parameters subfield 1230; and/or Broadcast Security subfield 1232.

The Broadcast Info Control subfield 1220 may be 1 byte in length and may contain indications whether certain broadcast information is contained in the eBCS N field. The Broadcast ID subfield 1222 may be 1 bit of length and indicate whether Broadcast ID is included in the eBCS N field.

The Higher Layer Destination Address subfield 1234 may be three bits in length and may indicate one of the following values: Higher Layer Destination Address not present, Higher Layer Destination Address present in the eBCS N field, and that the Higher Layer protocol may include: UDP/IPv4; UDP/IPv6; UDP/Hostname; MPEG Transport Stream identifier; MAC Address; and/or Reserved. The Title Present subfield 1236 may be one bit in length and may indicate whether an user readable title is present in the eBCS N field. If the Title Present bit is set to 1, then a Title Length subfield 1238 and a Title subfield 1240 may be included in the eBCS N field. A Broadcast Control Present subfield may be 1 bit in length and may indicate whether the Negotiation Method subfield is included in the eBCS N field.

The Broadcast ID subfield 1222 may indicate the ID of the Broadcast service. The eBCS Type subfield 1224 may include the type of broadcast service, e.g., whether the eBCS is UL or DL, or whether the broadcast service is of the category of automotive, direction, emergency, support, informational, event_support. In some implementations, a bitmap may be included in the DL Broadcast element to indicate which types of broadcast service are provided by the transmitting STAs. The type may also be multi-AP broadcast. In some implementations, the broadcast type may be identified by an organizationally unique identifier (OUI).

The Association Required subfield 1226 may indicate whether association is needed to consume one or more broadcast service, e.g., the broadcast service identified by the Broadcast ID. The UL Transmission Required subfield 1228 may indicate whether UL transmission is required to consume one or more broadcast service, e.g., the broadcast service identified by the Broadcast ID.

The Broadcast Control subfield 1244 may indicate how to control the broadcast service. For example, it may indicate that if a STA desires a certain broadcast service, it needs to directly negotiate with the transmitting STA, e.g., the transmitting AP, by using e.g., Broadcast Request frame. In another example, the subfield may indicate a server address, e.g., an IP address of the server, or a controller address, e.g., a MAC address or BSSID of another AP. Such a controller AP may be the master AP of a multi-AP set. The STA may also communicate with the controller or server to provide feedback of the broadcast service or negotiate rates, or encoding. The method for control may be through WLAN, TCP/IP, Broadcast Request negotiation, ANQP or GAS frame exchanges, etc. The Broadcast Parameters subfield may include one or more broadcast parameters, e.g., including Offset and/or Channel. For example, the offset of the start of the next broadcast packet, or broadcast bursts, which may be from the end of the current transmission, or from a target beacon transmission time (TBTT) or other reference points. The channel may include the channel or OFDMA subchannels or resource units (RUs) on which the broadcast service packets may be available.

The Higher Layer Destination Address subfield 1234 may take different lengths depending on the value indicated in the Higher Layer Protocol field of the Broadcast Service Info Control subfield 1220. The Higher Layer Destination Address subfield 1234 may contain the IP address and UDP port if IPv4/UDP or IPv6/UDP is indicated in the Higher Layer Protocol field. The Higher Layer Destination Address subfield 1234 may contain MAC address of 6 bytes, e.g., if the MAC address is indicated in the Higher Layer Protocol subfield. The Higher Layer Destination Address may not be included in the Broadcast Service Field if the Higher layer Protocol subfield indicates that no Higher Layer Destination Address field is present.

The Title Length subfield 1238 may be included in the Broadcast Service field, e.g., if the Title Present subfield 1236 in the Broadcast Service Info Control subfield is set to 1; otherwise it is not present. The Title Length field may be 1 byte in length and indicates the length of the Title subfield 1240.

The Title subfield 1240 may be included in the Broadcast Service field, e.g., if the Title Present subfield 1236 in the Broadcast Service Info Control subfield is set to 1; otherwise it may not be present. The Title Length field may be 1 byte in length and may indicate the length of the Title subfield 1240.

The Time to Termination subfield 1242 may be used to indicate the remaining time left at which the Broadcast Service described in this Broadcast Service field will terminate unless additional negotiation is conducted by the initiator of the broadcast service or by other users of the said Broadcast Service. In some implementations, the subfield may include a time (e.g., a TSF time value, or other type of time) at which the said Broadcast Service will terminate unless additional negotiation is conducted by the initiator of the broadcast service or by other users of the said Broadcast Service. Additionally or alternatively, a Timestamp of current time, such as the current value of the TSF timer may be included.

The Broadcast Control subfield 1244 may be included in the eBCS N field, e.g., if the Broadcast Control Present subfield is set to 1 in the Broadcast Info Control subfield 1220. The Broadcast Control subfield 1244 may be used to indicate the negotiation method that should be used to negotiate for the initialization, control or stop of the broadcast service. The Broadcast Control subfield 1244 may include one or more of the following values: Through Broadcast Service Request frames; Through ANQP/GAS Broadcast Service Request frames; and/or Through IP Request (in this case, the IP version and IP addresses that are needed for negotiation may be included.)

In some implementations, any subset of fields or subfields of the eBCS Service Capabilities element or eBCS Service Advertisement frame may be implemented in any field or subfield or a set or subset of fields of existing or newly designed elements or frames, or PHY and/or MAC headers of any management, control, and data frames, or other headers, or other frames.

Some implementations include an eBCS Service Request frame format. In some implementations, the eBCS Service Request frame format may be defined as follows. The eBCS Service Request frame may include a eBCS Service Request element. Such eBCS Service Request element may also be included in other frames such as Probe Request frames, Association request frames, ANQP/GAS eBCS Service Request frames, or any other type of frames, e.g., to request one or more eBCS Services.

Figure 13:
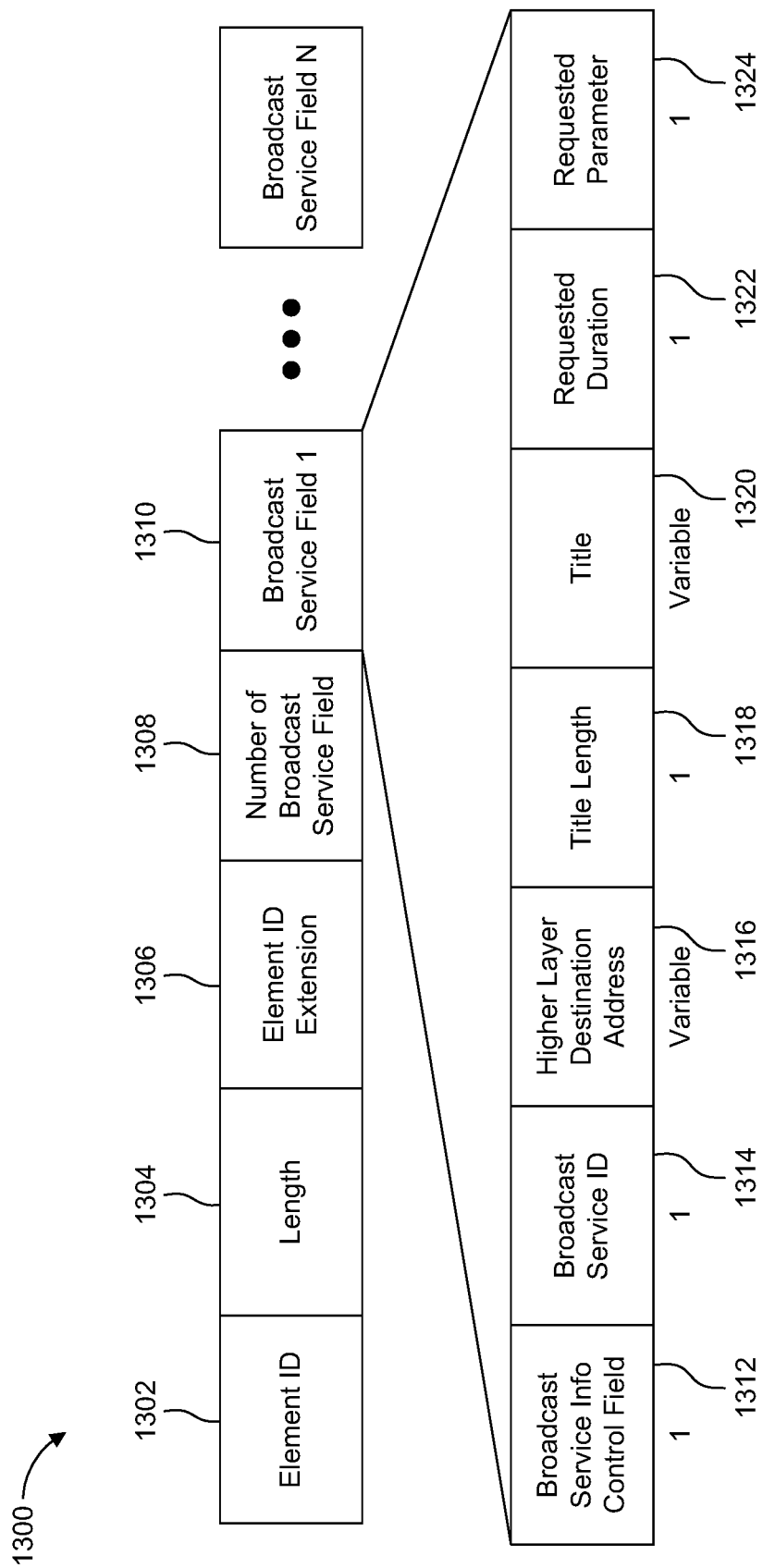
FIG. 13 is a diagram illustrating an example format of an eBCS Service Request element.

FIG. 13 is a bitmap diagram illustrating an example format of an eBCS Service Request element. As shown in FIG. 13, in some implementations, an eBCS Service Request element may contain one or more of the following fields: Element ID 1302, Length 1304, Element ID Extension 1306, Number of Broadcast Service fields 1308, and/or one or more of Broadcast Service fields 1310.

The Element ID field 1302, Length field 1304, and Element ID Extension field 1306 may be used to indicate that the current element is an eBCS Service request element and the length of the current element.

The Number of Broadcast Service fields field 1308 may be used to indicate the number of Broadcast Service fields that the element includes.

In the one or more of Broadcast Service fields 1310, each of the Broadcast Service fields 1310 contains the information of a particular Broadcast Service being requested, and may include the following subfields: Broadcast Service Info Control field subfield 1312, Broadcast Service ID subfield 1314, Higher Layer Destination Address subfield 1316, Title Length subfield 1318, Title subfield 1320, Requested Duration subfield 1322, and/or Requested Parameters subfield 1324.

The Broadcast Service Info Control Field subfield 1312 may be 1 byte in length and may include indications of whether certain broadcast information is contained in the Broadcast Service Field 1310. The Broadcast Service ID subfield 1314 may be 1 byte in length and may be used to indicate the identifier of the Broadcast Service. The Higher Layer Destination Address subfield 1316 may be of variable bit length depending on the value indicated in the Higher Layer Protocol field of the Broadcast Service Info Control subfield 1312. The Higher Layer Destination Address subfield 1316 may contain the IP address and UDP port if IPv4/UDP or IPv6/UDP is indicated in the Higher Layer Protocol field. It may contain MAC address of 6 bytes if MAC address is indicated in the Higher layer Protocol subfield. The Higher Layer Destination Address is not included in the Broadcast Service Field if the Higher layer Protocol subfield 1316 indicates that no Higher Layer Destination Address field is present.

The Title Length subfield 1318 may be included in the Broadcast Service field 1310 if the Title Present subfield in the Broadcast Service Info Control subfield is set to 1; otherwise it is not present. The Title Length field 1318 may be 1 byte in length and indicates the length of the Title Field. The title subfield 1320 may be included in the Broadcast Service field if the Title Present subfield 1406 in the Broadcast Service Info Control subfield 1312 is set to 1; otherwise it is not present. The Title Length subfield 1318 may be 1 byte in length and indicates the length of the Title subfield 1320. The Title subfield may be of variable byte length.

The Requested Duration subfield 1322 may be 1 byte in length and may be used to indicate the requested duration of the requested Broadcast service. The Requested Parameters subfield 1324 may be 1 byte in length and may indicate the requested parameter for the requested broadcast service, such as time offset compared to a fixed time reference point (e.g. TBTT), channel, RU resource, band, broadcast rate, etc.

Figure 14:
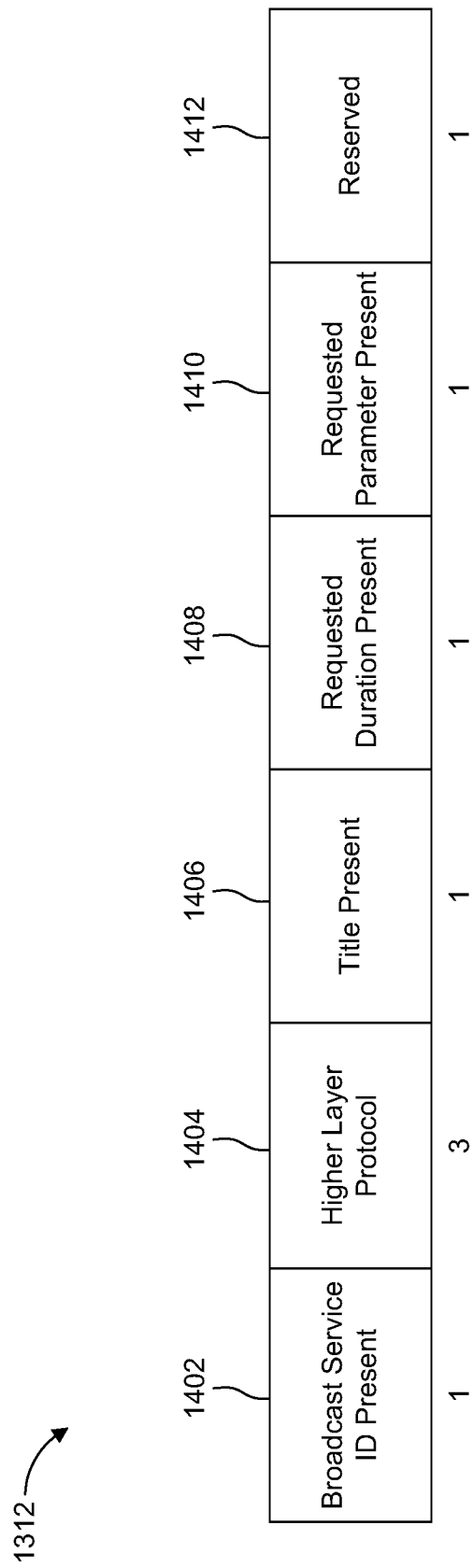
FIG. 14 is a diagram illustrating an example format of a Broadcast Service Info Control field.

FIG. 14 is a diagram illustrating an example format of the Broadcast Service Info Control Field subfield 1312. The Broadcast Service Info Control Field subfield 1312 may include a Broadcast Service ID Present subfield 1402, Higher Layer Protocol 1404 subfield, Title Present subfield 1406, Requested Duration Present subfield 1408, and Requested Parameter Present subfield 1410. The Broadcast Service Info Control Field subfield 1312 may also have a reserved subfield 1412.

The Broadcast Service ID Present subfield 1402 may be 1 bit in length and may indicate whether a Broadcast Service ID is included in the Broadcast Service Field 1310. The Higher Layer Protocol subfield 1404 may be three bits in length and may indicate one of the following values: Higher Layer Destination Address not present, Higher Layer Destination Address not present, and/or Higher Layer Destination Address present in the Broadcast Service Field 1310. The Higher Layer Protocol subfield 1404 may include: UDP/IPv4, UDP/IPv6, UDP/Hostname, MPEG Transport Stream identifier, and/or MAC Address. The Title Present subfield 1406 may be one bit in length and is used to indicate whether an user readable title is present in the Broadcast Service Field 1310. If the Title Present bit is set to 1, then a Title Length subfield and a Title subfield may be included in the Broadcast Service field 1310. The Negotiation Method Present subfield: this subfield may be 1 bit in length and may be used to indicate whether the Negotiation Method subfield is included in the Broadcast Service Field.

A Requested Duration Present subfield 1408 may be 1 bit in length and may indicate whether the Requested Duration for the requested Broadcast Service is present in the Broadcast Service Field 1310. A Requested Parameters Present subfield 1410 may be 1 bit in length and may indicate whether the Requested Parameters for the requested Broadcast Service is present in the Broadcast Service Field 1310.

In some implementations, any subset of fields or subfields of the eBCS Service Request element may be implemented in any field or subfield or a set or subset of fields of existing or newly designed elements or frames, or PHY and/or MAC headers of any management, control, data frames, or other headers, or other frames, such as EBCS Request frames.

Some implementations include an eBCS Service Response frame format. In some implementations, the eBCS Service Response frame format may be as follows. The eBCS Service Response frame may include a eBCS Service Response element. Such eBCS Service Response element may also be included in other frames such as Probe Response frames, Association response frames, ANQP/GAS eBCS Service Response frames, or any other type of frames to respond to one or more eBCS Services requests.

Figure 15:
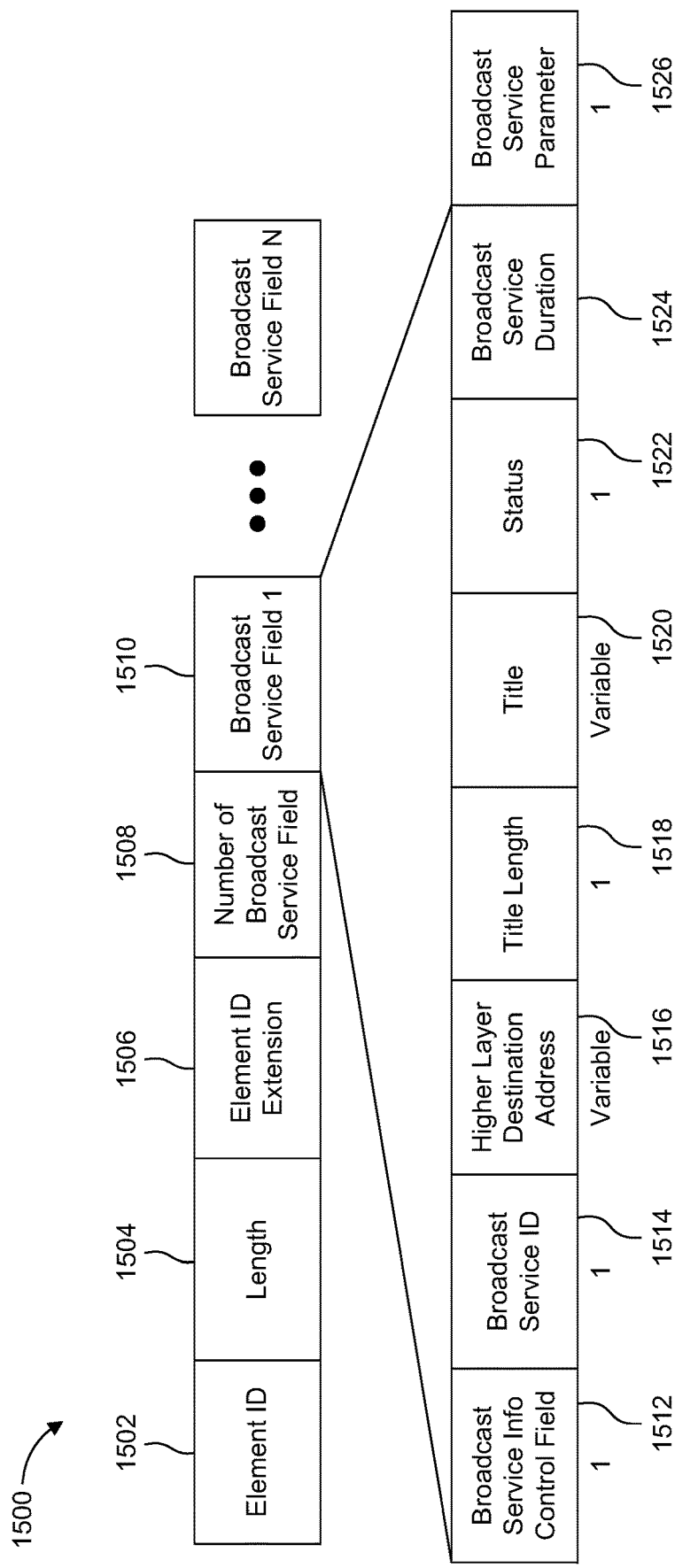
FIG. 15 is a diagram illustrating an example format of an eBCS Service Response element.

FIG. 15 is a bitmap diagram illustrating an example format of an eBCS Service Response element. In some implementations, the eBCS Service Response element may include one or more of the following fields: Element ID field 1502, Length field 1504, Element ID Extension field 1506, Number of Broadcast Service Fields field 1508, and/or one or more Broadcast Service Fields fields 1510.

The Element ID field 1502, Length field 1504, and Element ID Extension field 1506 may indicate that the current element is an eBCS Service response element and the length of the current element. The Number of Broadcast Service Fields field 1510 may indicate the number of Broadcast Service fields that the element includes.

Each of the one or more of Broadcast Service fields 1510 may include the response information of a particular Broadcast Service being requested, and may include one or more of a Broadcast Service Info Control field 1512, Broadcast Service ID field 1514, Higher Layer Destination Address subfield 1516 Title Length field 1518, Title field 1520, Status field 1522, Broadcast Service Duration field 1524, and/or Broadcast Service Parameters field 1526.

The Broadcast Service Info Control field 1512 may be 1 byte in length and may include indications of whether certain broadcast information is contained in the Broadcast Service Field field 1510.

Figure 16:
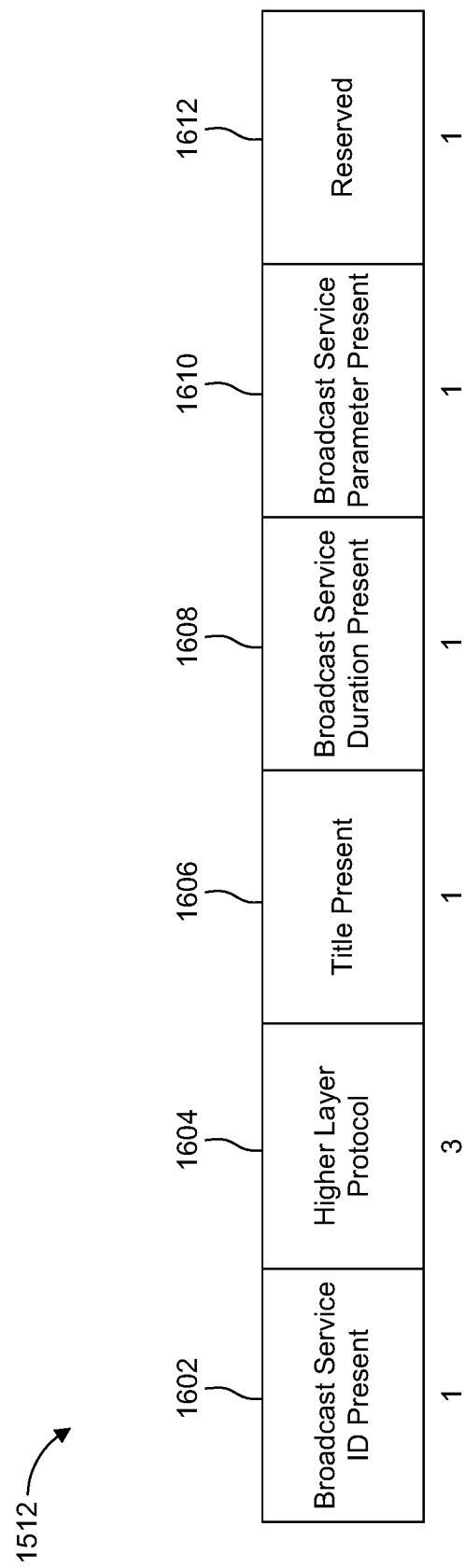
FIG. 16 is a diagram illustrating an example format of a Broadcast Service Info Control field in the eBCS Service Response element.

FIG. 16 illustrates an example format of the Broadcast Service Info Control subfield 1512. As shown in FIG. 16, the Broadcast Service Info Control field 1512 may include a Broadcast Service ID Present subfield 1602, Higher Layer Protocol subfield 1604, Title Present subfield 1606, Broadcast Service Duration Present subfield 1608, Broadcast Service Parameter Present subfield 1610, and/or Reserved subfield 1612.

The Broadcast Service ID Present subfield 1602 may be 1 bit in length and indicate whether Broadcast Service ID is included in the Broadcast Service Field. The Higher Layer Protocol subfield 1604 may be three bits in length and may indicate, for example, one or more of the following values: Higher Layer Destination Address not present, Higher Layer Destination Address present in the Broadcast Service Field (The Higher Layer protocol may be and/or be indicated as: UDP/IPv4, UDP/IPv6, UDP/Hostname, MPEG Transport Stream identifier, MAC Address, and/or Reserved).

The Title Present subfield 1606 may be one bit in length and may indicate whether an user readable title is present in the Broadcast Service Field 1510. If the Title Present bit is set to 1, then a Title Length subfield 1518 and a Title field 1520 may be included in the Broadcast Service field 1510.

The Broadcast Service Duration Present subfield 1608 may be 1 bit in length and may indicate whether the Broadcast Service Duration for the offered Broadcast Service is present in the Broadcast Service Field 1510. The Broadcast Service Parameters Present subfield 1610 may be 1 bit in length and may indicate whether the Broadcast Service Parameters for the requested Broadcast Service is present in the Broadcast Service Field 1510.

Referring back to FIG. 15, the Broadcast Service ID field 1514 may indicate the identifier of the Broadcast Service, and may be 1 byte in length. The Higher Layer Destination Address subfield 1516 may have different lengths, e.g., depending on the value indicated in the Higher Layer Protocol field of the Broadcast Service Info Control subfield. The Higher Layer Destination Address subfield 1516 may include the IP address and UDP port if IPv4/UDP or IPv6/UDP is indicated in the Higher Layer Protocol subfield 1604. The Higher Layer Destination Address subfield 1516 may include a MAC address, e.g., of 6 bytes, e.g., if MAC address is indicated in the Higher layer Protocol subfield 1604. The Higher Layer Destination Address may not be included in the Broadcast Service Field 1510, e.g., if the Higher layer Protocol subfield indicates that no Higher Layer Destination Address field is present. The Title Length subfield 1518 may be included in the Broadcast Service field 1510, e.g., if the Title Present subfield 1606 in the Broadcast Service Info Control subfield 1512 is set to 1; otherwise it may not be present. The Title Length field 1518 may be 1 byte in length and may indicate the length of the Title subfield 1520. The Title subfield 1520 may be included in the Broadcast Service field 1510, e.g., if the Title Present subfield in the Broadcast Service Info Control subfield 1512 is set to 1; otherwise it may not be present.

The Status subfield 1522 may indicate whether the request for the broadcast service is successful. The Status subfield may also contain the reason for rejection if a request is rejected. The Broadcast Service Duration subfield may indicate the duration of the provided Broadcast service. The Broadcast Service Parameters subfield may indicate the parameter for the provided broadcast service, such as time offset compared to a fixed time reference point (e.g. TBTT), channel, RU resource, band, broadcast rate, etc.

In some implementations, any subset of fields or subfields of the eBCS Service Response element may be implemented in any field or subfield or a set or subset of fields of existing or newly designed elements or frames, or PHY and/or MAC headers of any management, control, data frames, or other headers, or other frames, such as EBCS Request frames Some implementations include an eBCS Service Request/Response Procedure. Some implementations include an eBCS Service Request/Response Procedure for unassociated STAs. In some implementations, the eBCS Service Negotiation Procedure for unassociated STAs may be as follows.

In some implementations, an AP may advertise one or more broadcast service, e.g., using a Broadcast Service element in its beacon, probe responses, eBCS Service Advertisement frames, eBCS info frames, etc., and/or simply using probe responses, eBCS Service Advertisement frames, eBCS info frames, or EBCS Termination Notice frame, etc. The AP may indicate the negotiation method for one or more eBCS services, such as through ANQP/GAS frame exchanges, through Probe Request frames, through eBCS Service Request/response frames, or through IP packets.

An unassociated STA may discover a desired broadcast service either after receiving a frame from the AP, such as a EBCS info frames, EBCS Termination Notice frame, or EBCS ANQP Service frames, or from pre-acquired knowledge, or through ANQP/GAS frame exchanges from one or more APs. One or more Broadcast Services, which the AP is capable to provide but is currently not providing, which do not require association, may be requested by the STA. The STA may follow a negotiation method, e.g., as indicated by the AP for that eBCS service and may send a frame to the AP, such as a ANQP/GAS Broadcast Service request frame, or a public action frame containing eBCS Service Request element or information. The requested broadcast service may be indicated by certain IDs such as Broadcast Service ID, Higher Layer Destination Address, MAC address, Title, etc. When the Broadcast Service is being requested, a STA may request the Broadcast Service for a certain period of time, for example, the STA may request video playback for 10 minutes. The STA may also request certain parameters for the broadcast services, such as broadcast frequency, data rate used, to be on a particular channel or RU.

The AP may respond to a eBCS Service Request by sending a eBCS Response frame, or an ANQP/GAS eBCS Service Response frame, or a frame including an eBCS Service Response frame or information. The AP may indicate the status of the request for one or more eBCS Service, such as successful or reject, and it may include a reason for rejection if the request is rejected. The AP may indicate the remaining time of a broadcast service that it is providing. For example, the AP may include Broadcast Service Duration in the eBCS Service Response element, or include, e.g., periodically, an End of Broadcast Service Announcement element, in one or more of frames that it is transmitting, for example, in beacon frames, probe response frames, eBCS data frames, Broadcast Service Request frames, eBCS Service Advertisement frames, or eBCS Info frames, etc. The AP may also include Broadcast Service parameters if the request for the eBCS Service is successful, such as broadcast frequency, data rate used, to be on a particular channel or RU. The AP may thereafter start providing the requested eBCS services accordingly.

Some implementations include an eBCS Service Request/Response Procedure for associated STAs. In some implementations, the eBCS Service Negotiation Procedure for associated STAs may be as follows. An AP may advertise one or more broadcast services, e.g., using a Broadcast Service element in its beacon, probe responses, eBCS Service Advertisement frames, eBCS info frames, etc., or simply using probe responses, eBCS Service Advertisement frames, eBCS info frames, EBCS Termination Notice frame, etc. The AP may indicate the negotiation method for one or more eBCS services, e.g., through ANQP/GAS frame exchanges, through Probe Request frames, through eBCS Service Request/response frames, and/or through IP packets. The AP may indicate for one or more eBCS services that association is required to utilize those eBCS services.

A STA may discover a desired broadcast service either after receiving a frame from the AP, sucj as EBCS Info frame, EBCS Termination Notice frame, or EBCS ANQP Service frames, or from pre-acquired knowledge, and/or through ANQP/GAS frame exchanges from one or more APs. One or more Broadcast Services which the AP is capable to provide but is currently not providing, which require association, may be requested by the STA. If the STA is currently unassociated with the AP, the STA may conduct authentication and association with the AP. The STA may follow a negotiation method indicated by the AP for that eBCS service and may send a frame to the AP, such as an eBCS Service request frame, or a frame containing eBCS Service Request element or information, which may also be contained in the Probe Request frame and/or Association Request frame. The requested broadcast service may be indicated by certain IDs such as Broadcast Service ID, Higher Layer Destination Address, MAC address, Title, etc. When the Broadcast Service is being requested, a STA may request the Broadcast Service for a certain period of time. For example, the STA may request video playback for 10 minutes. The STA may also request certain parameters for the broadcast services, such as broadcast frequency, data rate used, to be on a particular channel or RU.

The AP may respond to a eBCS Service Request by sending a eBCS Response frames, or a frame containing an eBCS Servie Response frame or information, including probe response and association response frames. If a eBCS service requires association, the AP may not start the eBCS (enhanced Broadcasting service) service before the STA is fully associated with the AP. The AP may indicate the status of the request for one or more eBCS Service, such as successful, denied and it may include the rejection reasons. The AP may indicate the remaining time of a broadcast service that it is providing. For example, the AP may include Broadcast Service Duration in the eBCS Service Response element, or include, e.g., periodically, End of Broadcast Service Announcement element, in one or more of frames that it is transmitting, for example, in beacon frames, probe response frames, eBCS data frames, Broadcast Service Request frames, eBCS Service Advertisement frames, or eBCS Info frames, EBCS Termination Notice frame, etc. The AP may also include Broadcast Service parameters if the request for the eBCS Service is successful, such as broadcast frequency, broadcast Service Period duration, data rate used, to be on a particular channel or RU. The AP may thereafter start providing the requested eBCS services accordingly.

Some implementations include an eBCS Service Request/Response Procedure for receive-only STAs. In some implementations, the eBCS Service Negotiation Procedure for receive-only STAs is as follows. An AP may advertise one or more broadcast service using a Broadcast Service element in its beacon, probe responses, eBCS Service Advertisement frames, eBCS info frames, etc., and/or simply using probe responses, eBCS Service Advertisement frames, eBCS info frames, etc. The AP may indicate a negotiation method for one or more eBCS services, such as through ANQP/GAS frame exchanges, through Probe Request frames, through eBCS Service Request/response frames, and/or through IP packets. The AP may indicate for one or more eBCS services that association is required to utilize those eBCS services.

A STA may discover a desired broadcast service either after receiving a frame from the AP, such as EBCS Info frame, EBCS Termination Notice frame, or EBCS ANQP Service frame, or from pre-acquired knowledge, and/or by overhearing ANQP/GAS frame exchanges from one or more APs. One or more Broadcast Services, which require uplink transmissions or associations, may not be requested by receive-only STAs. The receive-only STA may follow the negotiation method as indicated by the AP for that eBCS service and may send, for example, an IP packet through a different network interface to the advertised IP address containing eBCS Service Request element or information.

If the request is successful, the AP may start providing the requested eBCS services accordingly. The AP may indicate the remaining time of a broadcast service that it is providing. For example, the AP may include, e.g., periodically, an End of Broadcast Service Announcement element in one or more of frames that it is transmitting (e.g., in beacon frames, probe response frames, eBCS data frames, Broadcast Service Request frames, eBCS Service Advertisement frames, EBCS Termination Notice frame, and/or eBCS Info frames, etc.).

Although the features and elements of the various examples above are described in particular combinations, each feature or element can be used alone without the other features and elements of the preferred embodiments or in various combinations with or without other features and elements of the present invention. Although the solutions described herein consider 802.11 specific protocols, it is understood that the solutions described herein are not restricted to this scenario and are applicable to other wireless systems as well.

Although xIFS and/or SIFS are used to indicate various inter frame spacing in the examples of the designs and procedures, all other inter frame spacing such as RIFS, AIFS, DIFS or other agreed time interval may be applied in the same solutions. Although four RBs per triggered TXOP are shown in some figures as example, the actual number of RBs/channels/bandwidth utilized may vary.

Figure 17:
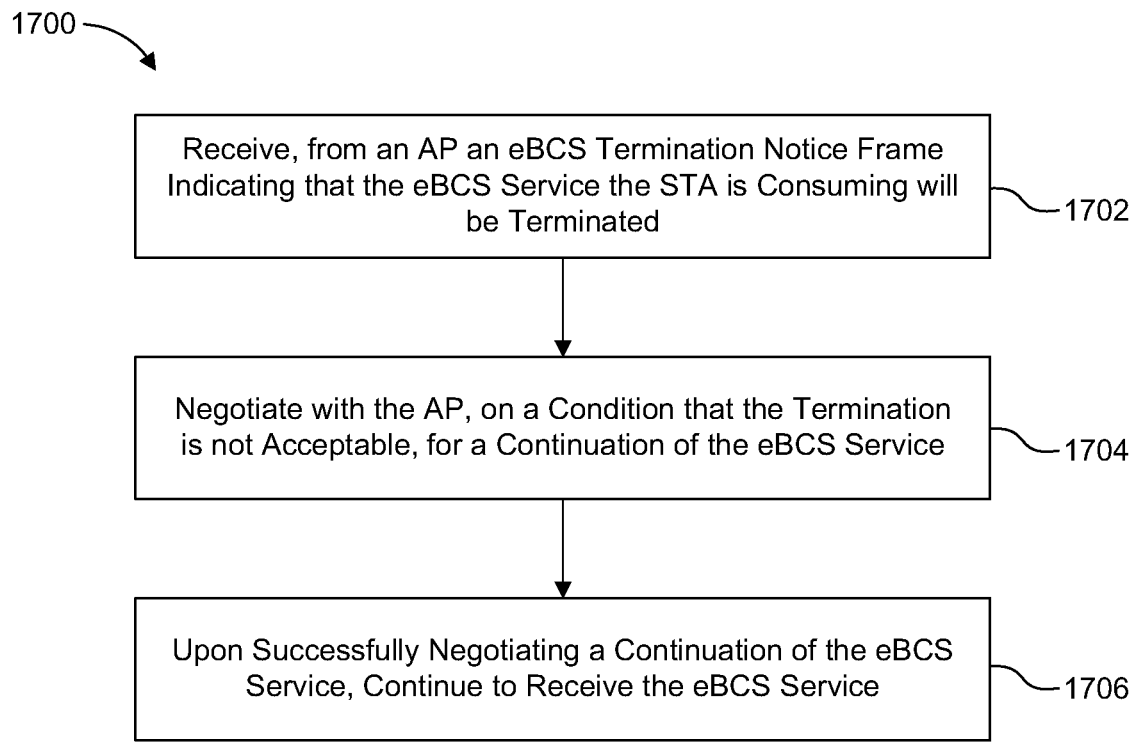
FIG. 17 illustrates an exemplary method of a STA requesting a continuation of an eNCS service.

FIG. 17 illustrates an exemplary method 1700 of a STA requesting a continuation of an eNCS service. At step 1702, the STA may first receive an eBCS termination notice frame, from an access point (AP), indicating that an eBCS service that the STA is consuming will be terminated. At step 1704, the STA, on a condition that the termination is not acceptable, may negotiate for a continuation of the eBCS service. Then, at step 1706, upon successfully negotiating a continuation of the eBCS service, the STA may continue to receive the eBCS service. The various steps described with respect to method 1700 are only examples, and it is noted that other implementations omit some of these steps, include additional steps, or perform these steps in a different order.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method implemented in a station (STA) comprising:
  receiving an enhanced broadcast service (eBCS) termination notice frame, from an access point (AP), indicating that an eBCS service that the STA is consuming will be terminated;
  receiving, from the AP, an indication of a negotiation method for extending the eBCS service, the indication being included in a negotiation method subfield, wherein the negotiation subfield indicates that:
    (a) no negotiation is available; or
    (b) the STA is to negotiate through one of:
      (i) eBCS Service Request frames,
      (ii) Access Network Query Protocol (ANQP) eBCS Service Request frames, or
      (ii) an IP request
  negotiating, with the AP, for a continuation of the eBCS service that the STA is consuming based on the received indication that the eBCS service that the STA is consuming will be terminated, and
  continuing to receive the eBCS service that the STA is consuming based on the negotiating.

2. The method of claim 1, wherein the enhanced broadcast service (eBCS) termination notice frame further includes a time to termination subfield that indicates a number of target beacon transmission times (TBTTs) until the eBCS service that the STA is consuming will be terminated.

3. The method of claim 1, wherein the enhanced broadcast service (eBCS) termination notice frame includes a category field, a public action field, and an eBCS termination information set field.

4. A station (STA) comprising:
  a transceiver; and
  a processor;
  wherein the transceiver and the processor are configured to:
    receive, from an access point (AP), an enhanced broadcast service (eBCS) termination notice, indicating an eBCS service that the STA is consuming will be terminated;
    receive, from the AP, an indication of a negotiation method for extending the eBCS service, the indication being included in a negotiation method subfield, wherein the negotiation method subfield indicates that:
      (a) no negotiation is available; or
      (b) the STA is to negotiate through one of:
        (i) eBCS Service Request frames,
        (ii) Access Network Query Protocol (ANQP) eBCS Service Request frames, or
        (ii) an IP request
    negotiate, with the AP, for a continuation of the eBCS service that the STA is consuming based on the received indication that the eBCS service that the STA is consuming will be terminated; and
    continue to receive the eBCS service that the STA is consuming based on the negotiating.

5. The STA of claim 4, wherein the enhanced broadcast service (eBCS) termination notice frame further includes a time to termination subfield that indicates a number of target beacon transmission times (TBTTs) until the eBCS service that the STA is consuming will be terminated.

6. The STA of claim 4, wherein the enhanced broadcast service (eBCS) termination notice frame includes a category field, a public action field, and an eBCS termination information set field.

* * * * *